United States Patent
Omichi et al.

(10) Patent No.: US 7,973,914 B2
(45) Date of Patent: *Jul. 5, 2011

(54) PHYSICAL QUANTITY MEASURING APPARATUS UTILIZING OPTICAL FREQUENCY DOMAIN REFLECTOMETRY AND METHOD FOR TEMPERATURE AND STRAIN MEASUREMENT USING THE APPARATUS

(75) Inventors: Koji Omichi, Sakura (JP); Akira Sakamoto, Sakura (JP); Shunichirou Hirafune, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/700,506

(22) Filed: Feb. 4, 2010

(65) Prior Publication Data

US 2010/0134783 A1   Jun. 3, 2010

Related U.S. Application Data

(63) Continuation of application No. PCT/JP2009/053898, filed on Mar. 2, 2009.

(30) Foreign Application Priority Data

Feb. 29, 2008 (JP) ................................. 2008-051344
Feb. 29, 2008 (JP) ................................. 2008-051345
Dec. 5, 2008  (JP) ................................. 2008-311286
Dec. 5, 2008  (JP) ................................. 2008-311287

(51) Int. Cl.
*G01N 21/00* (2006.01)
*G01L 1/24* (2006.01)
*G02B 6/00* (2006.01)

(52) U.S. Cl. ........ 356/73.1; 356/33; 356/35.5; 356/364; 356/31; 385/12; 385/15; 385/37; 250/227.14; 250/227.17; 250/225

(58) Field of Classification Search .................... 356/33, 356/35.5, 73.1, 478; 385/13, 12, 15, 37; 250/227.14, 226, 227.23

See application file for complete search history.

(56) References Cited

U.S. PATENT DOCUMENTS
6,417,507 B1 * 7/2002 Malvern et al. .......... 250/227.14
(Continued)

FOREIGN PATENT DOCUMENTS
JP        11-064119 A        3/1999
(Continued)

OTHER PUBLICATIONS

H. Igawa, et al., "Measurements of strain distributions with a long gauge FBG sensor using optical frequency domain reflectometry," Proceedings of SPIE, (2005), pp. 547-550, vol. 5855.

(Continued)

*Primary Examiner* — L. G Lauchman
(74) *Attorney, Agent, or Firm* — Sughrue Mion, PLLC

(57) ABSTRACT

A physical quantity measuring apparatus utilizing optical frequency domain reflectometry includes a tunable laser; a first polarization maintaining fiber; a polarization maintaining coupler; a second polarization maintaining fiber; a third polarization maintaining fiber; a sensor consists of a fiber Bragg grating formed in a core of the third polarization maintaining fiber; a fourth polarization maintaining fiber; a photodiode detects Bragg reflected light from the sensor and reference light from the referential reflecting end; a controller that detects modulation of an interference intensity between the Bragg reflected light and the reference light; and an incidence part that inputs the measuring light, wherein the incidence part being provided on the first polarization maintaining fiber or on both the second polarization maintaining fiber and the third polarization maintaining fiber.

19 Claims, 14 Drawing Sheets

U.S. PATENT DOCUMENTS

| | | | |
|---|---|---|---|
| 6,566,648 B1 * | 5/2003 | Froggatt | 250/227.14 |
| 6,795,599 B2 * | 9/2004 | Spirin et al. | 385/12 |
| 7,426,038 B2 | 9/2008 | Ogawa | |

FOREIGN PATENT DOCUMENTS

| | | |
|---|---|---|
| JP | 3819119 B2 | 3/1999 |
| JP | 2004-205368 A | 7/2004 |
| JP | 3740500 B2 | 7/2004 |
| JP | 2005-147900 A | 6/2005 |
| JP | 4102291 B2 | 6/2005 |
| WO | 2005/015149 A1 | 2/2005 |

OTHER PUBLICATIONS

H. Murayama, et al., "Distributed Strain Measurement with High Spatial Resolution Using Fiber Bragg Gratings and Optical Frequency Domain Reflectometry" Proceedings OFS-18, (2006), ThE40.

B. Childers, et al., "Use of 3000 Bragg grating strain sensors distributed on four eight-meter optical fibers during static load tests of a composite structure" Proceedings SPIE's 8th International Symposium on Smart Structure and Materials, (2001), pp. 133-142, vol. 4332.

* cited by examiner

PHYSICAL QUANTITY MEASURING APPARATUS UTILIZING OPTICAL FREQUENCY DOMAIN REFLECTOMETRY AND METHOD FOR TEMPERATURE AND STRAIN MEASUREMENT USING THE APPARATUS

This is a Continuation Application of International Patent Application No. PCT/JP2009/053898, filed on Mar. 2, 2009. Priority is claimed on Japanese Patent Application No. 2008-51344, filed Feb. 29, 2008, Japanese Patent Application No. 2008-51345, filed Feb. 29, 2008, Japanese Patent Application No. 2008-311286, filed Dec. 5, 2008, and Japanese Patent Application No. 2008-311287, filed Dec. 5, 2008, the contents of which are incorporated herein by reference.

TECHNICAL FIELD

The present invention relates to a physical quantity measuring apparatus utilizing optical frequency domain reflectometry (OFDR), and to a method for temperature and strain measurement using this physical quantity measuring apparatus. In the physical quantity measuring apparatus utilizing OFDR, one or a plurality of fiber Bragg grating (FBG) sensors are arranged on a (one) polarization maintaining (PM) fiber, and the position of the FBG sensor and physical quantities such as the strain and temperature of the FBG sensor are measured.

BACKGROUND ART

A sensor that measures physical quantities such as temperature and strain using an optical fiber have some advantages such as a long operating life, a lightweight, a thin diameter and a flexibility, and so it can be used in narrow spaces. In addition, this sensor has a characteristic of a strong resistance to electromagnetic noise due to insulation property of the optical fiber. For that reason, this sensor is expected to be used in structural health monitoring of large constructions such as bridges and buildings, and aerospace equipment such as passenger airplanes and manmade satellites.

Performance requirements of the sensor for applying the structural health monitoring in these structures include high strain resolution, high spatial resolution, in-sensor strain distribution measurement capability, having a multipoint (multiplexed) sensor (a wide detection range), and a capability of real-time measurement, and the like.

Although various optical fiber sensor systems have been previously proposed, an optical fiber sensor using an FBG sensor and the OFDR type analysis method is regarded as the most promising optical fiber sensor that sufficiently satisfies the above-mentioned performance requirements.

The optical fiber sensor system that uses the FBG sensor and the OFDR type analysis method determines the position of the FBG sensor using cyclical change in the interference light intensity between the Bragg reflected light from the FBG sensor and reflected light from the referential reflecting end (reflecting end for reference). In addition, this optical fiber sensor system measures strain and temperature of the detection portion from the change amount of the wavelength of the Bragg reflected light.

Hitherto disclosed examples of this optical fiber sensor system include one that is capable of measuring strain distribution in a sensor with high strain resolution (for example, refer to Non-Patent Literature 1 and Patent Literature 3), one that has a high spatial resolution of 1 mm or less (for example, refer to Non-Patent Literature 2), one in which eight hundred FBG sensors are multiplexed on an eight-meter optical fiber, and one can measure strain at more than three thousand points with a total of four optical fibers simultaneously (for example, refer to Non-Patent Literature 3), and one can real time measurements (for example, refer to Patent Literature 1). Here, in-sensor strain distribution measurement that is disclosed in Non-Patent Literature 1 and Patent Literature 3 means being able to measure non-uniform strain that occurs along the long direction of the FBG sensor.

A general problem of optical fiber sensor systems includes that, when there is change in a plurality of items of physical quantity such as temperature and strain, it is not possible to independently identify and measure amount of these changes. For that reason, for example, in the case of using an optical fiber sensor system as a strain sensor, a separate temperature-compensating sensor must be used so that temperature change of a detection portion is not treated as the change in strain.

To solve this problem, a method using FBG sensors that consist of a PM fibers has been proposed (for example, refer to Patent Literature 2). In this method, PANDA type PM fiber is used for FBG sensor, and temperature and strain can be measured by measuring the amount of change in the wavelength of Bragg reflected lights from two orthogonal polarization axes at the FBG sensor consists of this PANDA fiber. That is, this method provides a strain sensor that does not require a temperature-compensating sensor.

Conceivably, if the technologies mentioned above are combined in an optical fiber sensor system using FBG sensors consist of PM fiber and OFDR type analysis method; it will be possible to achieve high strain resolution, high spatial resolution, multi-point measuring, real-time measuring, and simultaneous measurement of temperature and strain.

[Patent Literature 1] Japanese Patent No. 3740500
[Patent Literature 2] Japanese Patent No. 3819119
[Patent Literature 3] Japanese Patent No. 4102291
[Non-Patent Literature 1] H. Igawa, H. Murayama, T. Kasai, I. Yamaguchi, K. Kageyama and K. Ohta, "Measurement of strain distributions with long gauge FBG sensor using optical frequency domain reflectometry" Proceedings OFS-17, pp. 547-550 (2005)
[Non-Patent Literature 2] H. Murayama, H. Igawa, K. Kageyama, K. Ohta, I. Ohsawa, K. Uzawa, M. Kanai, T. Kasai and I. Yamaguchi, "Distributed Strain Measurement with High Spatial Resolution Using Fiber Bragg Gratings and Optical Frequency Domain Reflectometry" Proceedings OFS-18, ThE40 (2006)
[Non-Patent Literature 3] B. Childers, M. E. Froggatt, S. G Allison, T. C. Moore, D. A. Hare, C. F. Batten and D. C. Jegley, "Use of 3000 Bragg grating strain sensors distributed on four eight-meter optical fibers during static load test of a composite structure" Proceedings SPIE's 8th International Symposium on Smart Structure and Materials, Vol. 4332, pp. 133-142 (2001)

DISCLOSURE OF THE INVENTION

Problems to be Solved by the Invention

However, an optical fiber system that uses a FBG sensor consists of a PM fiber and an OFDR type analysis method has not yet been proposed. It is because measuring light must be split (branched) in a well-controlled manner to the two orthogonal polarization axes, and must then be propagated to the FBG sensor and to a referential reflecting end, in order to obtain stable measurement of Bragg reflected lights from two orthogonal polarization axes at the FBG sensor. Usually, however, measuring light is emitted in a single polarization. Therefore, when the optical path to the FBG sensor and the referential reflecting end is formed from PM fiber, while one Bragg reflected light among the Bragg reflected lights from the two orthogonal polarization axes at the FBG sensor can be measured, but the other cannot. Consequently, Bragg reflected lights from the two orthogonal polarization axes cannot be measured in the manner described above.

As a method for splitting the single polarization measuring light into two orthogonal polarization axes, there is a method of constituting at least part of the optical path to the FBG sensor and the referential reflecting end with a single mode fiber. However, this method is problematic in that the measuring light emitted in a single polarization cannot be split in a well-controlled manner into the two orthogonal polarization axes.

The present invention has been made in consideration of the above circumstances, and aims to provide a physical quantity measuring apparatus utilizing OFDR, and a method for temperature and strain measurement using this physical quantity measuring apparatus. According to the apparatus and the method of the present invention, measurement of temperature and strain is particularly possible and temperature and strain can be measured with a high spatial resolution, in an optical fiber sensor system. This optical fiber sensor system uses OFDR type analysis method to identify the position of one or a plurality of FBG sensors provided in one PM fiber and measure physical quantities such as strain and temperature of the FBG sensor.

Means for Solving the Problems

The present invention employed the followings in order to achieve the above-mentioned aims to solve those problems.

(1) A physical quantity measuring apparatus utilizing optical frequency domain reflectometry includes a tunable laser that emits a measuring light; a first polarization maintaining fiber with one end thereof connected with the tunable laser; a polarization maintaining coupler connected with another end of the first polarization maintaining fiber; a second polarization maintaining fiber with one end thereof connected with the polarization maintaining coupler and another end thereof being a referential reflecting end; a third polarization maintaining fiber with one end thereof connected with the polarization maintaining coupler; a sensor consists of a fiber Bragg grating formed at a core of the third polarization maintaining fiber; a fourth polarization maintaining fiber with one end thereof connected with the polarization maintaining coupler; a photodiode connected with the polarization maintaining coupler via the fourth polarization maintaining fiber, and detects Bragg reflected light from the sensor and reference light from the referential reflecting end; a controller that detects modulation of an interference intensity between the Bragg reflected light and the reference light based on an intensity change of multiplexed light of the Bragg reflected light and the reference light detected by the photodiode; and an incidence part α that inputs the measuring light to both the two orthogonal polarization axes of the second polarization maintaining fiber and the two orthogonal polarization axes of the third polarization maintaining fiber, wherein the incidence part α being provided on the first polarization maintaining fiber or on both the second polarization maintaining fiber and the third polarization maintaining fiber.

(2) Preferably, the incidence part α is a 45-degree polarization axis offset angle fusion splice part on the first polarization maintaining fiber, while the incidence part α is provided on the first polarization maintaining fiber; and the incidence part α is preferably a 45-degree polarization axis offset angle fusion splice part on each of the second polarization maintaining fiber and the third polarization maintaining fiber, while the incidence parts α are provided on both the second polarization maintaining fiber and the third polarization maintaining fiber.

(3) A polarization beam splitter that splits the Bragg reflected light from the sensor preferably being provided in the fourth polarization maintaining fiber.

(4) An extension fiber that makes an optical path-length difference of the Bragg reflected light from the two orthogonal polarization axes in the sensor longer than an optical path-length corresponding to a length of the sensor is preferably being provided between the sensor and the polarization maintaining coupler in the third polarization maintaining fiber.

(5) While a length of the extension fiber being L, a difference of effective refractive indices of the two orthogonal polarization axes being $(n_{slow}-n_{fast})$, and the length of the sensor being 1, the length L preferably satisfies the following Equation (1).

$$L_1 > \frac{n_{slow} l}{n_{slow} - n_{fast}} \qquad (1)$$

(6) A physical quantity measuring apparatus utilizing optical frequency domain reflectometry includes a tunable laser that emits a measuring light; a first polarization maintaining fiber with one end thereof connected with the tunable laser; a polarization maintaining coupler connected with another end of the first polarization maintaining fiber; a second polarization maintaining fiber with one end thereof connected with the polarization maintaining coupler and another end thereof being a referential reflecting end; a third polarization maintaining fiber with one end thereof connected with the polarization maintaining coupler; a sensor consists of a fiber Bragg grating formed at a core of the third polarization maintaining fiber; a fourth polarization maintaining fiber with one end thereof connected with the polarization maintaining coupler; a photodiode connected with the polarization maintaining coupler via the fourth polarization maintaining fiber, and detects Bragg reflected light from the sensor and reference light from the referential reflecting end; a controller that detects modulation of an interference intensity between the Bragg reflected light and the reference light based on an intensity change of multiplexed light of the Bragg reflected light and the reference light detected by the photodiode; and an incidence part β that inputs measuring light to either polarization axis among two orthogonal polarization axes in the third polarization maintaining fiber, wherein the incidence part β being provided on the third polarization maintaining fiber.

(7) It is preferable that among the first polarization maintaining fiber to the fourth polarization maintaining fiber, the difference of the effective refractive indices of the two orthogonal polarization axes in at least the third polarization maintaining fiber is $4.4 \times 10^{-4}$ or more.

(8) A method for temperature and strain measurement using the physical quantity measuring apparatus utilizing optical frequency domain reflectometry of the present invention, includes measuring a wavelength of Bragg reflected light of two orthogonal polarization axes in one or a plurality of sensors using the physical quantity measuring apparatus utilizing optical frequency domain reflectometry according to one of the aforementioned (1) to (7); calculating an amount of change in the wavelength of the Bragg reflected light in the sensor caused by the temperature and strain, based on the measured wavelength of the Bragg reflected light; calculating the temperature and strain at a location where the sensor is provided based on the calculated amount of change.

(9) A method for temperature and strain measurement using the physical quantity measuring apparatus utilizing optical frequency domain reflectometry of the present invention, includes performing a short-time Fourier transform analysis for identifying a position of a sensor on each interference signal of two orthogonal polarization axes detected by a controller using the physical quantity measuring apparatus utilizing optical frequency domain reflectometry according to the aforementioned (3) or (6); and obtaining the position of the sensor in each polarization axis, by substituting each effective refractive index of the polarization axes in each optical path-length of the Bragg reflected light from the two orthogonal polarization axes in the sensor.

(10) A method for temperature and strain measurement using the physical quantity measuring apparatus utilizing optical frequency domain reflectometry of the present invention, includes performing a short-time Fourier transform analysis for identifying a position of a sensor on a summation of interference signals from two orthogonal polarization axes detected by a controller using the physical quantity measuring apparatus utilizing optical frequency domain reflectometry according to the aforementioned (4) or (5); and obtaining a distance to the sensor from a reference position in each polarization axis, by substituting one arbitrary effective refractive index in each optical path-length of the Bragg reflected light from the two orthogonal polarization axes in the sensor.

(11) It is preferable to further comprises calculating temperature distribution and strain distribution along a long direction of a location where the sensor is provided on the third polarization maintaining fiber.

Effect of the Invention

According to the physical quantity measuring apparatus utilizing optical frequency domain reflectometry described in aforementioned (1), since the measuring apparatus includes the FBG sensor that is formed in the core of the polarization maintaining fiber, and the incidence part α that makes measuring light incident to two orthogonal polarization axes of the polarization maintaining fiber where the sensor is provided, it is possible to measure the Bragg reflected light from the two orthogonal polarization axes in the FBG sensor, and it is possible to measure the change amount of the wavelength of the Bragg reflected light from the two orthogonal polarization axes in the FBG sensor. Thereby the temperature and strain can be measured, and also the temperature and strain can be measured with high spatial resolution.

According to the method for temperature and strain measurement using the physical quantity measuring apparatus utilizing optical frequency domain reflectometry described in the aforementioned (8), it is possible to measure strain and temperature from one FBG sensor.

According to the method for temperature and strain measurement using the physical quantity measuring apparatus utilizing optical frequency domain reflectometry described in the aforementioned (9), since a short time Fourier transform analysis for determining the position of the FBG sensor is performed, each effective refractive index of the polarization axes are substituted in each optical path-length of the Bragg reflected light from the two orthogonal polarization axes in the FBG sensor, and the fiber position of the FBG sensor in each polarization axes is obtained, it is possible to perform temperature and strain measurement of the FBG sensor with a high spatial resolution.

According to the method for temperature and strain measurement using the physical quantity measuring apparatus utilizing optical frequency domain reflectometry described in the aforementioned (10), when obtaining the fiber length corresponding to the optical path-length to the FBG sensor obtained by short time Fourier transform analysis, by substituting one arbitrary effective refractive index in each optical path-length of the Bragg reflected light from the two orthogonal polarization axes of the sensor, it is possible to individually identify and measure the Bragg reflected light from the two orthogonal polarization axes of the FBG sensor without the Bragg reflected light overlapping with the wavelength axis. As a result, it is possible to improve the measurement accuracy of the temperature and strain of the FBG sensor.

Moreover, the temperature distribution and the strain distribution along the long direction of the FBG sensor can also be measured simultaneously.

[Description of Reference Numerals]

Figure 1:
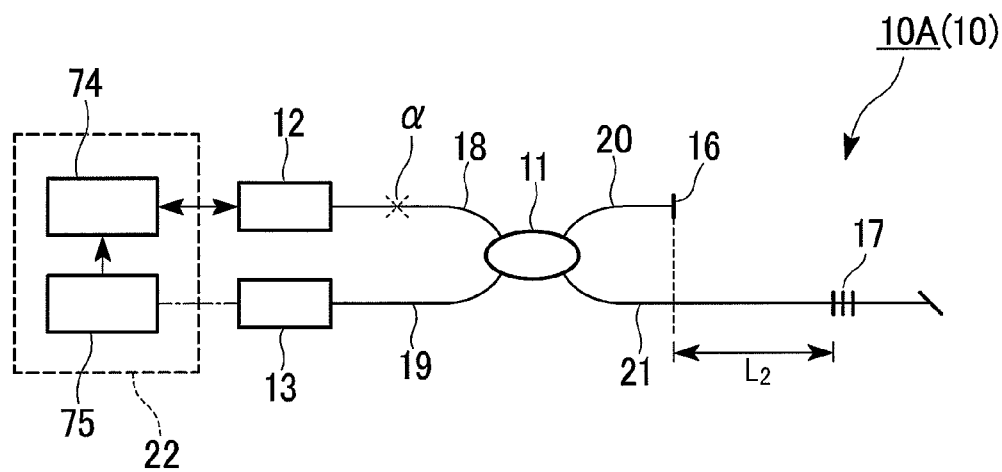
FIG. 1 is a schematic configuration view showing the first embodiment of the physical quantity measuring apparatus utilizing optical frequency domain reflectometry of the present invention.

10A, 10B, 10C, 10D, 10E, 10F, 10G, 10H, 10I, 10J, 10K (10) physical quantity measuring apparatus utilizing optical frequency domain reflectometry
11 polarization maintaining coupler
12 tunable laser
13, 14 photodiode
15 polarization beam splitter
16 referential reflecting end
17 sensor
18, 19, 20, 21 polarization maintaining fiber
22 controller
74 system controller
75 A/D converter
80 (80A, 80B) PANDA fiber
81 (81A, 81B) core
82 (82A, 82a, 82B, 82b) stress-applying parts
α, β incidence part

BEST MODE FOR CARRYING OUT THE INVENTION

Embodiments of an optical fiber sensor system of the present invention will be explained with reference to the drawings.

First Embodiment

FIG. 1 is a schematic configuration view that shows the first embodiment of the physical quantity measuring apparatus utilizing optical frequency domain reflectometry (hereinafter abbreviated as "OFDR") of the present invention.

A physical quantity measuring apparatus utilizing OFDR (OFDR type physical quantity measuring apparatus) 10A (10) of the present embodiment broadly includes a tunable laser (TLS) 12 that emits a measuring light; a first polarization maintaining fiber 18 of which one end is connected with this tunable laser 12; a polarization maintaining coupler 11 that is connected with another end of the first polarization maintaining fiber 18; a second polarization maintaining fiber 20 with one end thereof connected with this polarization maintaining coupler 11 and another end thereof being a referential reflecting end 16; a third polarization maintaining fiber 21 of which one end is connected with the polarization maintaining coupler 11; a sensor 17 that consists of a fiber Bragg grating formed in the core of this third polarization maintaining fiber; a fourth polarization maintaining fiber 19 of which one end is connected with the polarization maintaining coupler 11; a photodiode 13 that is connected with the polarization maintaining coupler 11 via this fourth polarization maintaining fiber and that detects Bragg reflected light from the sensor 17 and reference light from the referential reflecting end 16; a controller 22 that detects modulation of the interference intensity between the Bragg reflected light and the reference light, based on the intensity change of multiplexed optical between the Bragg reflected light and the reference light detected by the photodiode 13; and an incidence part α that inputs the measuring light to both of the two orthogonal polarization axes of the second polarization maintaining fiber 20 and the two orthogonal polarization axes of the third polarization maintaining fiber 21. In the present embodiment, the polarization maintaining coupler 11 is constituted from the same type of PM fiber as the first to fourth polarization maintaining (hereinafter abbreviated as "PM") fibers.

As the tunable laser 12, it is ideal to use a laser whose coherence length is longer than the optical path-length from the point where the measuring light is emitted from the tunable laser 12 to the point where, after being reflected from the sensor 17, it is inputs to the photodiode 13.

As the photodiode 13, it is ideal to use one with a cutoff frequency that can detect intensity modulation of the optical interference obtained from the two reflection points, that is, the referential reflecting end 16 and the sensor 17, when the wavelength of the measuring light emitted from the tunable laser 12 is changed.

The controller 22, for example, includes an A/D converter 75 that samples signals from the photodiode 13, and a system controller 74 that analyzes this sampling data. As the A/D converter 75, it is ideal to use one with a sampling frequency that can detect intensity modulation of the optical interference detected by the photodiode 13. The A/D converter 75 digitally samples the analog optical interference signal measured by the photodiode 13. This digital interference signal is then transmitted to the system controller 74. In the system controller 74, short-time Fourier transform (hereinafter 'STFT') analysis is performed using this digital interference signal. This analysis method will be described later. There are no particular restrictions on the type of the system controller 74, the sole requirement being that it can perform STFT analysis of the digital interference signal obtained by the A/D converter 75. The system controller 74 is connected with the tunable laser 12 via general purpose interface bus (GPIB), and controls the tunable laser 12.

Figure 2:
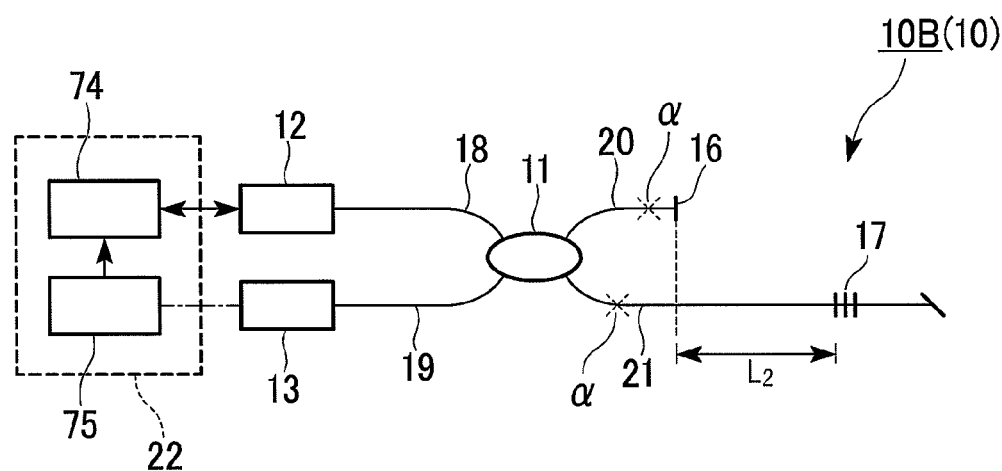
FIG. 2 is a schematic configuration view showing a modification of the same embodiment.

The incidence part α is provided in the first PM fiber 18, and splits the measuring light emitted as a single polarization from the tunable laser 12 into the two orthogonal polarization axes of the first PM fiber 18. The incidence part α need only be capable of making the measuring light incident to both the two orthogonal polarization axes of the second PM fiber 20 and the two orthogonal polarization axes of the third PM fiber 21, and as shown in FIG. 2, can also be provided on both of the second PM fiber 20 and the third PM fiber 21. Since the incidence part α can acceptably be provided at a single location, and it is preferable that the incidence part α is provided in the first stage of split part between the PM fiber 21 in which the sensor 17 is formed and the PM fiber 20 that has the referential reflecting end 16 (i.e., the first PM fiber 18).

Also, any type of the incidence part α can be used, provided that it can split the single polarization measuring light into the two orthogonal polarization axes of the PM fiber, such as a method of inserting a λ/2 plate, a method of providing a polarization axis angle offset fusion splice, or a method of arranging the PM fiber so that the polarization axes of the PM fiber has an angle offset with respect to the single polarization measuring light from the tunable laser 12, and joining the light emitted from the tunable laser 12 to the PM fiber.

Among these methods, from the point of being simple and the point of being able to uniformly split the measuring light into two polarized beams, the incidence part α is preferably a 45-degree polarization axis offset angle fusion slice portion (hereinafter called a "45-degree offset fusion splice") to the first PM fiber 18.

Here, a polarization axis angle offset fusion splice means fusion-splicing two PM fibers such that forming an offset angle of one polarization axes of one PM fiber with respect to that of the other PM fiber in a fusion splice point. An offset angle of one polarization axes of the PM fiber has formed in the fusion point signifies that a similar offset angle of the other polarization axis orthogonal thereto also has formed, and two PM fibers are fusion spliced to each other.

Figure 3:
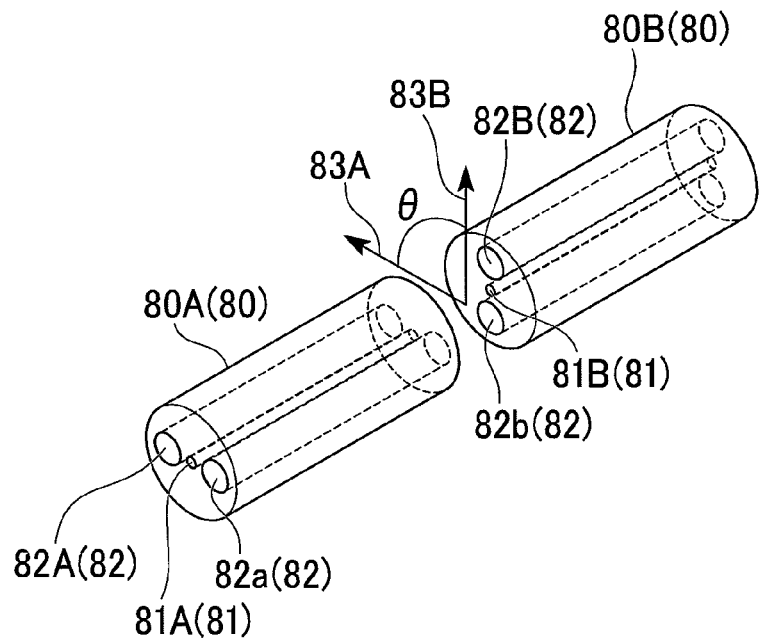
FIG. 3 is a schematic perspective view showing a polarization axis angle offset fusion splice in the case of using a PANDA fiber as a PM fiber.

FIG. 3 is a schematic view showing the state of 45-degree offset fusion splice in the case of using PANDA (Polarization-maintaining AND Absorption reducing) fibers as the PM fibers.

Here, a PANDA fiber 80 includes circular stress-applying parts 82 provided in the cladding on both ends of the core 81, in order to impart birefringence to the fiber. A propagation constant difference (effective refractive index difference) is occurred between the two orthogonal polarization modes, by these stress-applying parts 82. This enables coupling from each polarization mode to the other polarization mode to be suppressed. The polarization axes which these two orthogonal polarization modes propagate along are called the slow axis and the fast axis, and the effective refractive index difference between the slow axis and the fast axis is called the birefringence.

By connecting the straight line that connects these two stress-applying parts 82 and the core 81 (that is, the straight line 83A that connects the two stress-applying parts 82A, 82a and the core 81A of the PANDA fiber 80A; and the straight line 83B that connects the two stress-applying parts 82B, 82b and the core 81B of the PANDA fiber 80B) so as to obtain the desired polarization axis offset angle θ between these two PANDA fibers 80A and 80B, it is possible to achieve the desired offset fusion splice.

In the physical quantity measuring apparatus utilizing OFDR 10A of the present embodiment, the incidence part α for splitting the measuring light that is emitted as a single polarization from the tunable laser 12 into two orthogonal polarization axes of the first PM fiber 18, is provided between the tunable laser 12 and the PM coupler 11. Thereby, it is possible to obtain Bragg reflected light from the two orthogonal polarization axes in the sensor 17. If a change in the wavelength of the Bragg reflected light from the two orthogonal polarization axes is detected, it is possible to measure the temperature and strain of the location where the sensor 17 is placed, and as a result, it is possible to achieve a strain sensor in which a temperature compensation sensor is not required.

[Method of Identifying Sensor Position]

Next, the method of identifying the position of the sensor 17 using the physical quantity measuring apparatus utilizing OFDR 10A of the present embodiment shall be described. In this example, PANDA fibers are used as the first to fourth PM fibers.

In the physical quantity measuring apparatus utilizing OFDR 10A of the present embodiment, interference light between the Bragg reflected light from the sensor 17 and the reflected light from the referential reflecting end 16 are inputted to the photodiode 13. An optical interference signal $D_1$ that is inputted to the photodiode 13 is the summation of the two orthogonal polarization axes, and is expressed by the following Equation (2).

$$D_1 = R_{slow} \cos(k 2 n_{slow} L_2) + R_{fast} \cos(k 2 n_{fast} L_2) \qquad (2)$$

In the above Equation (2), $R_{slow}$ and $R_{fast}$ represent the intensity of the interference light from the two orthogonal polarization axes of the PANDA fiber, that is, they represent the interference light intensity from the slow axis (X axis) and the fast axis (Y axis). k represents the wavenumber, $n_{slow}$ and $n_{fast}$ represent the effective refractive indices of the slow axis (X axis) and the fast axis (Y axis). $L_2$ represents the difference between the length from the PM coupler 11 to the referential reflecting end 16 in the second PANDA fiber 20, and the length from the PM coupler 11 to the sensor 17 in the third PANDA fiber 21. That is, as shown in FIG. 1, $L_2$ represents the fiber length from the position corresponding to the length of the second PANDA fiber 20 that has the referential reflecting end 16 to the sensor 17 in the third PANDA fiber 21.

Using the physical quantity measuring apparatus utilizing OFDR 10A of the present embodiment, the aforementioned $D_1$ is obtained, and the obtained optical interference signal $D_1$ is subjected to STFT analysis in the system controller 74 that is provided in the controller 22. Thereby, the optical pathlengths $n_{slow} L_2$ and $n_{fast} L_2$ that correspond to $L_2$ in the two orthogonal polarization axes of the third PANDA fiber 21 are obtained. In addition, in the physical quantity measuring apparatus of the present invention, the analog optical interference signal that corresponds to the aforementioned Equation (2) measured in the photodiode 13 is digitally sampled by the A/D converter 75 provided in the controller 22, and this digital interference signal is subjected to STFT analysis in the system controller 74 that is provided in the controller 22. However, in the present text, even when the description is abbreviated as 'the optical interference signal measured by the photodiode 13 is subjected to STFT analysis in the system controller 74 that is provided in the controller 22, it is to be understood that the same process is being performed. As stated above, since the A/D converter 75 has a sampling frequency that can detect the intensity modulation of the optical interference detected by the photodiode 13, the analog optical interference signal and the sampled digital interference signal are theoretically the same signals. Also, points that can more effectively explain the features of the invention, by using a formula that represents an analog optical interference signal, will be explained using the optical interference signal.

Next, in the physical quantity measuring apparatus utilizing OFDR 10A of the present embodiment, one arbitrary effective refractive index is substituted in the obtained two optical path-lengths $n_{slow}L_2$ and $n_{fast}L_2$, and $L_2$ is obtained. Thereby, the position of the sensor 17 can be identified. In the present embodiment, using the Bragg reflected light that is obtained from the two orthogonal polarization axes in the sensor 17, the position of the sensor 17 is obtained.

[Method for Temperature and Strain Measurement]

Next, the method for temperature and strain measurement using the physical quantity measuring apparatus utilizing OFDR 10A of the present embodiment will be explained.

Firstly, the wavelength of the Bragg reflected lights from the two orthogonal polarization axes of the sensor 17 at a reference temperature (for example, 20° C.) and a reference strain (for example, 0 με) is measured in advance.

Next, the sensor 17 is provided at the location where detection is deemed desirable (hereinafter called the "detection portion"), and at this detection portion, the wavelength of the Bragg reflected light from the two orthogonal polarization axes of the sensor 17 is measured.

Next, the wavelength difference (change amount) between the wavelength of the Bragg reflected light at the detection portion and the wavelength of the Bragg reflected light at the reference temperature and reference strain is calculated.

Next, the obtained wavelength difference is substituted into the Equation (3) below, to obtain the difference between the temperature at the detection portion and reference temperature, and the difference between the strain at the detection portion and the reference strain, and finally the actual temperature and actual strain at the detection portion are calculated from the known reference temperature and the reference strain.

$$\begin{bmatrix} \Delta T \\ \Delta \varepsilon \end{bmatrix} = \frac{1}{D} \begin{bmatrix} \frac{\partial \lambda_{fast}}{\partial \varepsilon}, & -\frac{\partial \lambda_{slow}}{\partial \varepsilon} \\ -\frac{\partial \lambda_{fast}}{\partial T}, & \frac{\partial \lambda_{slow}}{\partial T} \end{bmatrix} \begin{bmatrix} \Delta \lambda_{slow} \\ \Delta \lambda_{fast} \end{bmatrix} \quad (3)$$

where, $$D = \frac{\partial \lambda_{fast}}{\partial \varepsilon} \cdot \frac{\partial \lambda_{slow}}{\partial T} - \frac{\partial \lambda_{fast}}{\partial T} \cdot \frac{\partial \lambda_{slow}}{\partial \varepsilon}$$

In the abovementioned Equation (3), $\Delta T$ represents the difference between the temperature at the detection portion and the reference temperature. $\Delta \varepsilon$ represents the difference between the strain at the detection portion and the reference strain. $\Delta \lambda_{slow}$ and $\Delta \lambda_{fast}$ represent the difference between the wavelength of the Bragg reflected light from the two orthogonal polarization axes of the sensor 17 at the detection portion and the wavelength of the Bragg reflected light from the two orthogonal polarization axes of the sensor 17 at the reference temperature and the reference strain, respectively. $\partial \lambda_{slow}/\partial \varepsilon$ and $\partial \lambda_{fast}/\partial \varepsilon$ represent the Bragg wavelength shift amount of the slow axis and the fast axis per unit of strain. $\partial \lambda_{slow}/\partial T$ and $\partial \lambda_{fast}/\partial T$ represent the Bragg wavelength shift amount of the slow axis and the fast axis per unit of temperature.

The abovementioned Bragg wavelength shift amounts per unit of strain and per unit of temperature are obtained by using the physical quantity measuring apparatus utilizing OFDR 10A, and applying strain to the sensor 17 at the reference temperature (20° C.) and measure the strain dependence of the Bragg wavelength change in the sensor 17, and applying a temperature change to the sensor 17 at the reference strain (0 με) and measuring the temperature dependence of the Bragg wavelength change in the sensor 17.

Next, from the values of these $\partial \lambda_{slow}/\partial \varepsilon$, $\partial \lambda_{fast}/\partial \varepsilon$, $\partial \lambda_{slow}/\partial T$ and $\partial \lambda_{fast}/\partial T$, the D value in the aforementioned Equation (3) is obtained. Then, by substituting this D value and the $\Delta \lambda_{slow}$ and $\Delta \lambda_{fast}$ obtained from the measuring result into the aforementioned Equation (3) and carrying out the operation, the $\Delta T$ and the $\Delta \varepsilon$ are obtained. Then, by subtracting the reference temperature and the reference strain from these values, the temperature and strain in the detection portion are obtained.

These calculations can be easily performed using the system controller 74.

Second Embodiment

Figure 4:
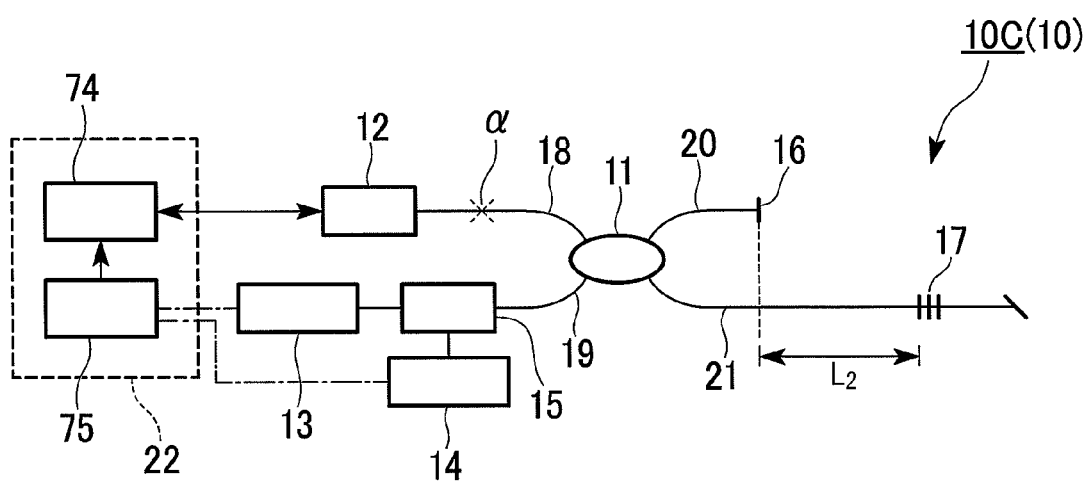
FIG. 4 is a schematic configuration view showing the second embodiment of the physical quantity measuring apparatus utilizing optical frequency domain reflectometry of the present invention.

FIG. 4 is a schematic configuration view that shows the second embodiment of the physical quantity measuring apparatus utilizing OFDR 10C of the present invention. The present embodiment differs from the first embodiment in that a polarization beam splitter 15 that splits the Bragg reflected light from the sensor 17 being further provided in the fourth PM fiber 19, and a first photodiode 13 and a second photodiode 14 being connected with this polarization beam splitter 15. The incidence part α, similarly to the aforementioned first embodiment, may be provided in both the second PM fiber 20 and the third PM fiber 21.

The polarization beam splitter 15 is consists of PM fibers of the same type as the aforementioned first to fourth PM fibers. The interference light between the Bragg reflected light from the sensor 17 and the reflected light from the referential reflecting end 16 is inputted to this polarization beam splitter 15. This interference light is split into two orthogonal polarization axes by the polarization beam splitter 15, and then be inputted to the first photodiode 13 and the second photodiode 14 respectively.

The tunable laser 12, the PM coupler 11, the first photodiode 13, the incidence part α, the first to fourth PM fibers, and the controller 22 is the same as the first embodiment. Also, as the second photodiode 14, it is possible to use one that is the same type as the first photodiode 13.

According to the physical quantity measuring apparatus utilizing OFDR 10C of the present embodiment, by splitting the interference light between the Bragg reflected light from the two orthogonal polarization axes in the sensor 17 and the reflected light from the referential reflecting end 16 into interference light of each polarization axis by the polarization beam splitter 15, it is possible to measure them by the first photodiode 13 and the second photodiode 14 respectively. Thereby, it is possible to individually indicate and measure the Bragg reflected light from the two orthogonal polarization axes at the sensor 17 without the Bragg reflected light overlapping with the wavelength axis. As a result, the measurement accuracy of the temperature and strain at the detection portion increases. Also, since parallel processing of the optical interference signals obtained from the first photodiode 13 and the second photodiode 14 is possible, measurement of the temperature and strain of the sensor 17 can be carried out in a short time.

[Method of Identifying Sensor Position]

Next, the method of identifying the position of the sensor using the physical quantity measuring apparatus utilizing OFDR 10C of the present embodiment will be described. In this embodiment, PANDA fibers are used as the first to fourth PM fibers.

In the physical quantity measuring apparatus utilizing OFDR 10C of the present embodiment, the interference light between the Bragg reflected light from the sensor 17 and the reflected light from the referential reflecting end 16 is split into two orthogonal polarization axes by the polarization beam splitter 15, and is inputted to the first photodiode 13 and the second photodiode 14 respectively. The optical interference signal $D_2$ that is inputted to the first photodiode 13 is expressed by Equation (4) below. The optical interference signal $D_3$ that is inputted to the second photodiode 14 is expressed by Equation (5) below.

$$D_2 = R_{slow} \cos(k2n_{slow}L_2) \qquad (4)$$

$$D_3 = R_{fast} \cos(k2n_{fast}L_2) \qquad (5)$$

In the above Equations (4) and (5), $R_{slow}$ and $R_{fast}$ represent the intensity of the interference light from the two orthogonal polarization axes of the PANDA fiber, that is, the interference light intensity from the slow axis (X axis) and the fast axis (Y axis). k represents the wavenumber, and $n_{slow}$ and $n_{fast}$ represent the effective refractive indices of the slow axis (X axis) and the fast axis (Y axis). Similarly to the first embodiment, $L_2$ represents the fiber length from the position corresponding to the length of the PANDA fiber 20 that has the referential reflecting end 16 to the sensor 17 in the PANDA fiber 21.

Using the physical quantity measuring apparatus utilizing OFDR 10C of the present embodiment, the aforementioned $D_2$ and $D_3$ are obtained, and by subjecting the obtained optical interference signals $D_2$ and $D_3$ to the STFT analysis in the system controller 74, the optical path-lengths $n_{slow}L_2$ and $n_{fast}L_2$ that correspond to $L_2$ in the two orthogonal polarization axes of the PANDA fiber are obtained.

Next, in the physical quantity measuring apparatus utilizing OFDR 10C of the present embodiment, $L_2$ is obtained by substituting known $n_{slow}$ and $n_{fast}$ into the obtained two optical path-lengths $n_{slow}L_2$ and $n_{fast}L_2$.

As $n_{slow}$ and $n_{fast}$ here, it is possible to use the value obtained from the wavelength of the Bragg reflected light from the sensor 17 and the grating period that is calculated from the interval of the diffraction grating of the uniform period phase mask used in the manufacture of the sensor 17, or a value obtained from near-field pattern measurement.

As described above, in the method of identifying the sensor position using the physical quantity measuring apparatus utilizing OFDR 10C of the present embodiment, since $L_2$ is obtained by substituting known $n_{slow}$ and $n_{fast}$ into the obtained two optical path-lengths $n_{slow}L_2$ and $n_{fast}L_2$, it is possible to accurately determine the fiber length $L_2$ of the sensor 17. For that reason, it is possible to perform measurement at a high spatial resolution.

[Method for Temperature and Strain Measurement]

Next, the method for temperature and strain measurement using the physical quantity measuring apparatus utilizing OFDR 10C of the present embodiment will be explained. In the case of using the physical quantity measuring apparatus utilizing OFDR 10C of the present embodiment, it is possible to perform measurement similarly to the first embodiment.

In the same way as in the event of the first embodiment, the wavelength of the Bragg reflected light from the two orthogonal polarization axes of the sensor 17 at a reference temperature (for example, 20° C.) and a reference strain (for example, 0 με) is measured in advance.

Next, the sensor 17 is arranged at the detection portion, and at this detection portion, the wavelength of the Bragg reflected light from the two orthogonal polarization axes of the sensor 17 is measured.

Next, the wavelength difference (change amount) between the wavelength of the Bragg reflected light at the detection portion and the wavelength of the Bragg reflected light at the reference temperature and reference strain are calculated.

Next, the obtained wavelength difference is substituted into the aforementioned Equation (3). Therefore, the difference between the temperature at the detection portion and the reference temperature, and the difference between the strain at the detection portion and the reference strain are obtained. Finally, the actual temperature and actual strain at the detection portion are calculated from the known reference temperature and the reference strain.

Next, the D value in the aforementioned Equation (3) is obtained from these values. Then, by substituting this D value and the $\Delta\lambda_{slow}$ and $\Delta\lambda_{fast}$ obtained from the measuring result into the aforementioned Equation (3) and carrying out the operation, the $\Delta T$ and the $\Delta\epsilon$ are obtained. Then, by subtracting the reference temperature and the reference strain from these values, the temperature and strain at the detection portion are obtained.

In the method for temperature and strain measurement using the physical quantity measuring apparatus utilizing OFDR 10C of the present embodiment, since it is possible to measure the change amount in the wavelength of the Bragg reflected light from the two orthogonal polarization axes of the sensor 17, in which the change in wavelength is caused by the induced temperature and the strain for the sensor, the measurement accuracy of the temperature and strain at the detection portion increases.

Third Embodiment

Figure 5:
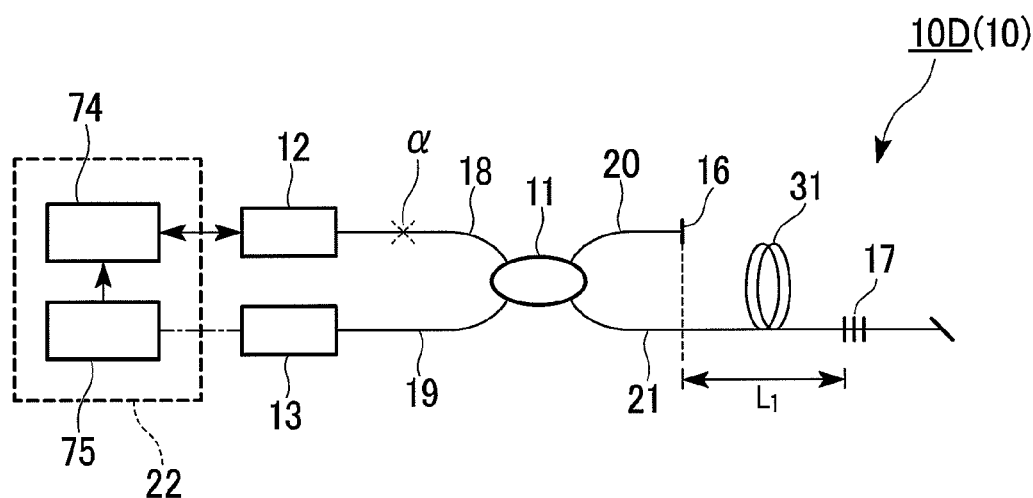
FIG. 5 is a schematic configuration view showing the third embodiment of the physical quantity measuring apparatus utilizing optical frequency domain reflectometry of the present invention.

FIG. 5 is a schematic configuration view that shows the third embodiment of the physical quantity measuring apparatus utilizing OFDR 10D of the present invention.

The present invention differs from the first embodiment in that an extension fiber 31 is provided between the sensor 17 and the PM coupler 11 in the third PM fiber 21, in which the extension fiber 31 is for making the optical path-length difference of the Bragg reflected light from the two orthogonal polarization axes in the sensor 17 longer than the optical path-length corresponding to the length of the sensor 17. Similarly to the aforementioned first embodiment, the incidence part α can be provided in both the second PM fiber 20 and the third PM fiber 21. When providing the incidence part α in the third PM fiber, the incidence part α is provided between the extension fiber 31 and the PM coupler 11.

It is the same as the first embodiment in relation to the tunable laser 12, the PM coupler 11, the photodiode 13, the incidence part α, the first to fourth PM fibers, and the controller 22.

As the extension fiber 31, it is preferable to use the same type of PM fiber as the third PM fiber 21 in which the sensor 17 is formed.

When the extension fiber 31 and the third PM fiber 21 in which the sensor 17 is formed are the same type of fiber, the length of the extension fiber 31 is set to be $L_1$, the difference of the effective refractive indices of the two orthogonal polarization axes of the third PM fiber 21 in which the sensor 17 is set to be $(n_{slow}-n_{fast})$, and the length of the sensor 17 is set to be 1, then the length $L_1$ of the extension fiber 31 preferably satisfies the following Equation (6).

$$L_1 > \frac{n_{slow} l}{n_{slow} - n_{fast}} \quad (6)$$

At this time, the length l of the sensor 17 and the excess fiber length between the extension fiber 31 and the sensor 17 are sufficiently short with respect to the length $L_1$ of the extension cable 31, and so can be ignored.

In the physical quantity measuring apparatus utilizing OFDR 10D of the present invention, when the extension fiber 31 and the third PM fiber 21 in which the sensor 17 is formed are different types of fibers, the length of the extension fiber 31 is preferably made a length so as to have an optical path-length that is longer than the optical path-length corresponding to $L_1$ of the aforementioned Equation (6).

In the physical quantity measuring apparatus utilizing OFDR 10D of the present embodiment, the incidence part α is provided between the tunable laser 12 and the PM coupler 11, in which the incidence part α is for splitting the measuring light that is emitted as a single polarization from the tunable laser 12 into the two orthogonal polarization axes of the second PM fiber 20 and the third PM fiber 21. For this reason, it is possible to obtain Bragg reflected light from the two orthogonal polarization axes in the sensor 17, and it is possible to measure temperature and strain in the sensor 17 simultaneously from the change in the wavelength of the Bragg reflected light from the two orthogonal polarization axes. As a result, it is possible to achieve a strain sensor in which a temperature compensation sensor is not required.

Also, since the extension fiber 31 is provided, the Bragg reflected light from the two orthogonal polarization axes in the sensor 17 do not overlap with the wavelength axis. As a result, it is possible to identify and measure the respective change amounts individually, and it is possible to improve the measuring accuracy of temperature and strain of the detection portion.

[Method of Identifying Sensor Position]

Next, the method of identifying the position of the sensor using the physical quantity measuring apparatus utilizing OFDR 10D of the present embodiment will be described. In this embodiment, PANDA fibers are used as the first to fourth PM fibers.

In the physical quantity measuring apparatus utilizing OFDR 10D of the present embodiment, the interference light between the Bragg reflected light from the sensor 17 and the reflected light from the referential reflecting end 16 is inputted to the photodiode 13. The optical interference signal $D_4$ that is inputted to the photodiode 13 is the summation of the two orthogonal polarization axes, and is represented by the following Equation (7).

$$D_4 = R_{slow} \cos(k2n_{slow}L_1) + R_{fast} \cos(k2n_{fast}L_1) \quad (7)$$

In the above Equation (7), $R_{slow}$ and $R_{fast}$ represent the intensity of the interference light from the two orthogonal polarization axes of the PANDA fiber, that is, the interference light intensity from the slow axis (X axis) and the fast axis (Y axis). k represents the wavenumber, $n_{slow}$ and $n_{fast}$ represent the effective refractive indices of the slow axis (X axis) and the fast axis (Y axis). $L_1$ represents the length of the extension fiber 31 (to be precise, the difference between the length from the PM coupler 11 to the referential reflecting end 16 in the second PANDA fiber 20, and the length from the PM coupler 11 to the sensor 17 in the third PANDA fiber 21. When the extension fiber 31 is sufficiently longer than the second PANDA fiber 20, and the length of the third PANDA fiber 21 is nearly the same as the second PANDA fiber 20, $L_1$ can be regarded as the length of the extension fiber 31).

Using the physical quantity measuring apparatus utilizing OFDR 10D of the present embodiment, the aforementioned $D_4$ is obtained, and the obtained optical interference signal $D_4$ is subjected to STFT analysis in the system controller 74 of the controller 22. Thereby, the optical path-lengths $n_{slow}L_1$ and $n_{fast}L_1$ that correspond to $L_1$ in the two orthogonal polarization axes of the PANDA fiber are obtained.

Next, in the physical quantity measuring apparatus utilizing OFDR 10D of the present embodiment, one arbitrary effective refractive index (for example, $n_{slow}$) is substituted in the obtained two optical path-lengths $n_{slow}L_1$ and $n_{fast}L_1$ to obtain $L_1$.

As this one arbitrary effective refractive index, it is possible to use the value obtained from the wavelength of the Bragg reflected light from the sensor 17 and the grating period that is calculated from the interval of the diffraction grating of the uniform period phase mask used in the manufacture of the sensor 17, or a value obtained from near-field pattern measurement.

As described above, in the method for temperature and strain measurement using the physical quantity measuring apparatus utilizing OFDR 10D of the present embodiment, $L_1$ is obtained by substituting one arbitrary effective refractive index (for example, $n_{slow}$) in the obtained two optical path-lengths $n_{slow}L_1$ and $n_{fast}L_1$. Because of that, the extension fiber length $L_1$ differs in the slow axis and the fast axis from an aspect of analysis. As a result, the position of the Bragg reflected light deviates from the respective polarization axes, and it is possible to individually identify and measure them without overlapping with the wavelength axes. Therefore, it is possible to accurately measure the wavelength of each Bragg reflected light.

[Method for Temperature and Strain Measurement]

Next, the method for temperature and strain measurement using the physical quantity measuring apparatus utilizing OFDR 10D of the present embodiment will be explained. In the case of using the physical quantity measuring apparatus utilizing OFDR 10D of the present embodiment, it is possible to perform measurement similarly to the first and second embodiments.

In the same way as in the event of the first and the second embodiments, the wavelength of the Bragg reflected light from the two orthogonal polarization axes of the sensor 17 at a reference temperature and a reference strain is measured in advance.

Next, the sensor 17 is arranged at the detection portion, and at this detection portion, the wavelength of the Bragg reflected light from the two orthogonal polarization axes of the sensor 17 is measured.

Next, wavelength difference (change amount) between the wavelength of the Bragg reflected light at the detection portion and the wavelength of the Bragg reflected light at the reference temperature and reference strain are calculated for the slow axis and fast axis.

Next, the obtained wavelength difference is substituted into the aforementioned Equation (3), and the difference between the temperature at the detection portion and reference temperature, and the difference between the strain at the detection portion and the reference strain are obtained, and finally the actual temperature and actual strain at the detection portion are calculated from the known reference temperature and the reference strain.

Next, the D value described in the aforementioned Equation (3) is obtained from these values. Then, by substituting this D value and the $\Delta\lambda_{slow}$ and $\Delta\lambda_{fast}$ obtained from the measuring result into the aforementioned Equation (3) and carrying out the operation, the $\Delta T$ and the $\Delta\epsilon$ are obtained. Then, by subtracting the reference temperature and the reference strain from these values, the temperature and strain in the detection portion are obtained.

In the method for temperature and strain measurement using the physical quantity measuring apparatus utilizing OFDR 10D of the present embodiment, by substituting one arbitrary effective refractive index in each optical path-length of the Bragg reflected light from the two orthogonal polarization axes in the sensor 17, it is possible to individually identify and measure the respective change amounts of the Bragg reflected light from the two orthogonal polarization axes in the sensor 17 without the Bragg reflected light overlapping with the wavelength axis. As a result, it is possible to measure the temperature and strain of the detection portion simultaneously. Also, it is possible to improve the measurement accuracy of the temperature and strain at the detection portion.

Fourth Embodiment

Figure 6:
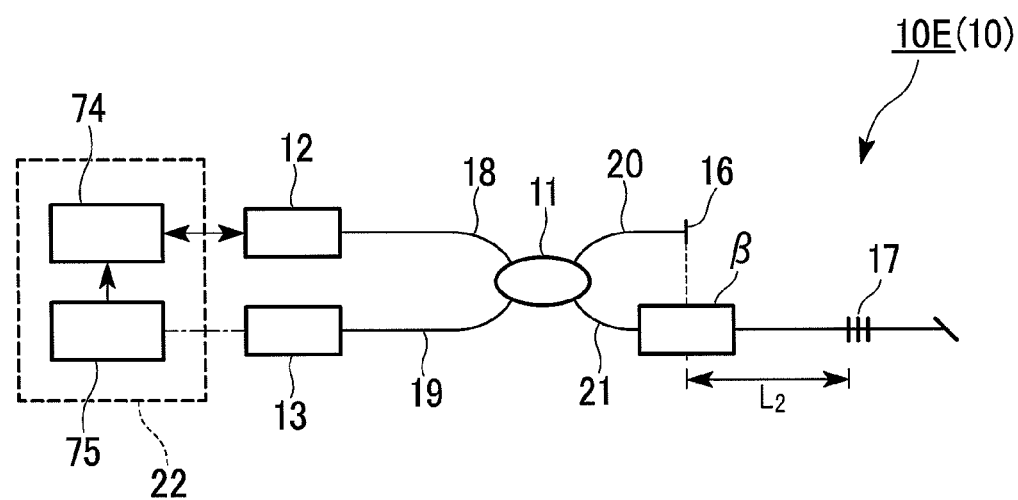
FIG. 6 is a schematic configuration view showing the fourth embodiment of the physical quantity measuring apparatus utilizing optical frequency domain reflectometry of the present invention.

FIG. 6 is a schematic configuration view that shows the fourth embodiment of the physical quantity measuring apparatus utilizing OFDR 10E of the present invention.

The present embodiment differs from the first embodiment in that an incidence part β is provided instead of the incidence part α, in which the incidence part β inputs the measuring light to either polarization axis among the two orthogonal polarization axes in the third PM fiber 21.

As the incidence part β, provided it is capable of inputting the measuring light to either polarization axis among the two orthogonal polarization axes in the third PM fiber 21 in which the sensor 17 is formed, it is not particularly limited, and for example includes a λ/2 plate or the like.

The incidence part β is preferably provided after the split part (bifurcation part) of the third PM fiber 21 in which the sensor 17 is formed and the second PM fiber 20 that has the referential reflecting end 16, and before the sensor 17. That is, the incidence part β is preferably provided between the PM coupler 11 and the sensor 17 in the third PM fiber 21. Moreover, the incidence part β is preferably provided at a position in which the fiber length from the PM coupler 11 to the referential reflecting end 16 is the same as the fiber length from the PM coupler 11 to the incidence part β. By providing the incidence part β at this position, in the method of identifying the sensor position described below, it is possible to accurately obtain the position of the sensor 17.

In the physical quantity measuring apparatus utilizing OFDR 10E of the present embodiment, it is possible to freely control the angle at which the measuring light is inputted to the incidence part β(λ/2 plate) by changing the angle of the incidence part β (λ/2 plate) by external control or manual control.

When the measuring light that is emitted as a single polarization from the tunable laser 12 is inputted to the incidence part β (λ/2 plate) at an angle of 0°, 90°, 180°, 270°, the measuring light reaches the sensor 17 by propagating along the original polarization axis without changing the polarization axis. Then, also when the reflected light has passed the incidence part β (λ/2 plate), it propagates along the original polarization axis without changing the polarization axis. That is, the measuring light that propagates through the slow axis of the sensor 17 is inputted to the photodiode 13 with the polarization axis maintained. In the present embodiment, this is defined as the slow axis measurement mode.

On the other hand, when the measuring light that is emitted as a single polarization from the tunable laser 12 is inputted to the incidence part β (λ/2 plate) at an angle of 45°, 135°, 225°, 315°, the measuring light reaches the sensor 17 by being converted to the other polarization axis. Then, also when the reflected light has passed the incidence part β (λ/2 plate), it is converted to the original polarization axis. That is, the measuring light that propagates through the slow axis of the sensor 17 is converted to the fast axis to reach the sensor 17. Then, when the Bragg reflected light from the sensor 17 passes the incidence part β (λ/2 plate), it is converted to the slow axis and inputted to the photodiode 13. In the present embodiment, this is defined as the fast axis measurement mode.

Accordingly, in the physical quantity measuring apparatus utilizing OFDR 10E of the present embodiment, for example by performing the first measurement by the slow axis measurement mode, and performing the second measurement by the fast axis measurement mode, two signals are respectively obtained. Therefore, the respective signals can be individually analyzed, and an improvement in measurement accuracy is achieved.

[Method of Identifying Sensor Position]

Next, the method of identifying the position of the sensor using the physical quantity measuring apparatus utilizing OFDR 10E of the present embodiment will be described. In this case, PANDA fibers are used as the first to fourth PM fibers.

In the physical quantity measuring apparatus utilizing OFDR 10E of the present embodiment, the interference light between the Bragg reflected light from the sensor 17 and the reflected light from the referential reflecting end 16, is inputted to the photodiode 13. The optical interference signal $D_5$ is decided by the angle of the measuring light with respect to the incidence portion β (λ/2 plate), in which the signal $D_5$ is inputted to the photodiode 13, and is expressed by the following Equations (8) and (9).

When the measuring light is inputted to the incidence part β (λ/2 plate) at 0°, 90°, 180°, 270° (slow axis measurement mode), the optical interference signal $D_5$ is expressed by the following Equation (8), in which the signal $D_5$ is inputted to the photodiode 13. Also, when the measuring light is inputted to the incidence part β (λ/2 plate) at 45°, 135°, 225°, 315° (fast axis measurement mode), the optical interference signal $D_6$ is expressed by the following Equation (9), in which the signal $D_6$ is inputted to the photodiode 13.

$$D_5 = R_{slow} \cos(k2n_{slow}L_2) \tag{8}$$

$$D_6 = R_{slow} \cos(k2n_{slow}L_2) \tag{9}$$

Using the physical quantity measuring apparatus utilizing OFDR 10E of the present embodiment, the aforementioned optical interference signals $D_5$ and $D_6$ are respectively obtained. In addition, the optical path-lengths $n_{slow}L_2$ and $n_{fast}L_2$ that correspond to $L_2$ in the two orthogonal polarization axes of the PANDA fiber are obtained, by subjecting the obtained optical interference signals $D_5$ and $D_6$ to the STFT analysis in the system controller 74 of the controller 22.

Next, in the physical quantity measuring apparatus utilizing OFDR 10E of the present embodiment, $L_2$ is obtained by substituting the known $n_{slow}$ into the optical wavelength $n_{slow}L_2$ which is obtained from the optical interference signal $D_5$ that was obtained by the slow axis measurement mode. In addition, $L_2$ is obtained by substituting the known $n_{fast}$ into the optical wavelength $n_{fast}L_2$ which is obtained from the optical interference signal $D_6$ that was obtained by the fast axis measurement mode.

In the present embodiment, for example the first measurement is performed by the slow axis measurement mode, and the second measurement is performed by the fast axis measurement mode. That is, two different signals are obtained in two measurements, and the signals are individually analyzed. For that reason, $L_2$ is obtained by substituting the known $n_{slow}$ and $n_{fast}$ into the two optical wavelengths $n_{slow}L_2$ and $n_{fast}L_2$ obtained by the respective measurements. Therefore, it is possible to accurately measure the fiber length $L_2$ of the sensor 17.

In the physical quantity measuring apparatus utilizing OFDR 10E of the present embodiment, since the Bragg reflected light from the two orthogonal polarization axes of the sensor 17 is obtained, it is possible to measure the temperature and the strain. Thereby, when performing strain measurement using the physical quantity measuring apparatus utilizing OFDR 10E, a temperature compensation sensor is not required. Also, since only the optical interference signal from the Bragg reflected light in one of the two orthogonal polarization axes of the sensor 17 is obtained in one measurement, it is possible to individually identify and measure the change amounts of the Bragg reflected light from the two orthogonal polarization axes of the sensor 17. Thereby, improvement of the measurement accuracy of the temperature and strain in the sensor 17 is achieved.

[Method for Temperature and Strain Measurement]

Next, the method for temperature and strain measurement using the physical quantity measuring apparatus utilizing OFDR 10E of the present embodiment will be explained. Also in the case of using the physical quantity measuring apparatus utilizing OFDR 10E of the present embodiment, it is possible to perform measurement similarly to the first to third embodiments.

In the same way as in the event of the first to third embodiments, first the wavelength of the Bragg reflected light from the two orthogonal polarization axes of the sensor 17 at a reference temperature and a reference strain is measured in advance.

Next, the sensor 17 is arranged at the detection portion. The wavelength of the Bragg reflected light from the two orthogonal polarization axes of the sensor 17 is measured respectively at this detection portion.

Next, the wavelength difference (change amount) between the wavelength of the Bragg reflected light at the detection portion and the one at the reference temperature and reference strain are calculated for the slow axis and fast axis respectively.

Next, the obtained wavelength difference is substituted into the aforementioned Equation (3), and the difference between the temperature at the detection portion and reference temperature, and the difference between the strain at the detection portion and the reference strain are obtained. Finally, the actual temperature and actual strain at the detection portion are calculated from the known reference temperature and the reference strain.

Next, the D value described in the aforementioned Equation (3) is obtained from these values. Then, by substituting this D value and the $\Delta\lambda_{slow}$ and $\Delta\lambda_{fast}$ obtained from the measuring result into the aforementioned Equation (3) and carrying out the operation, the $\Delta T$ and the $\Delta\epsilon$ are obtained. Then, by subtracting the reference temperature and the reference strain from these values, the temperature and strain in the detection portion are obtained.

In the method for temperature and strain measurement using the physical quantity measuring apparatus utilizing OFDR 10E of the present embodiment, since it is possible to measure the change amount in the wavelength of the Bragg reflected light from the two orthogonal polarization axes in the sensor 17 respectively, the measurement accuracy of the temperature and strain at the detection portion improves. In which, the change amount in the wavelength is caused by the induced temperature and strain for the sensor.

Regarding the aforementioned physical quantity measuring apparatuses utilizing OFDR of the first embodiment to the fourth embodiment, it is preferable that the third PM fiber 21 in which the sensor is arranged consists of a PM fiber in which the effective refractive index difference (birefringence) of the two orthogonal polarization axes is large. Thereby, the difference in sensitivity to temperature and strain in the two orthogonal polarization axes becomes large, and it is possible to measure temperature and strain with high accuracy. More specifically, the effective refractive index difference of the two orthogonal polarization axes is preferably not less than $4.4 \times 10^{-4}$. By satisfying this value, it is possible to make the shift characteristics difference of the Bragg wavelength with respect to the temperature change of the sensor greater than $-5.0 \times 10^{-4}$ nm/°C., as obtained from the Examples described below. As a result, extremely high measurement accuracy of temperature and strain can be obtained, such as a temperature error of 2° C. and a strain error of 20 µε is obtained.

EMBODIMENTS

While the invention will now be described more specifically by examples, but the invention is not limited to these examples.

Embodiment 1

Figure 7:
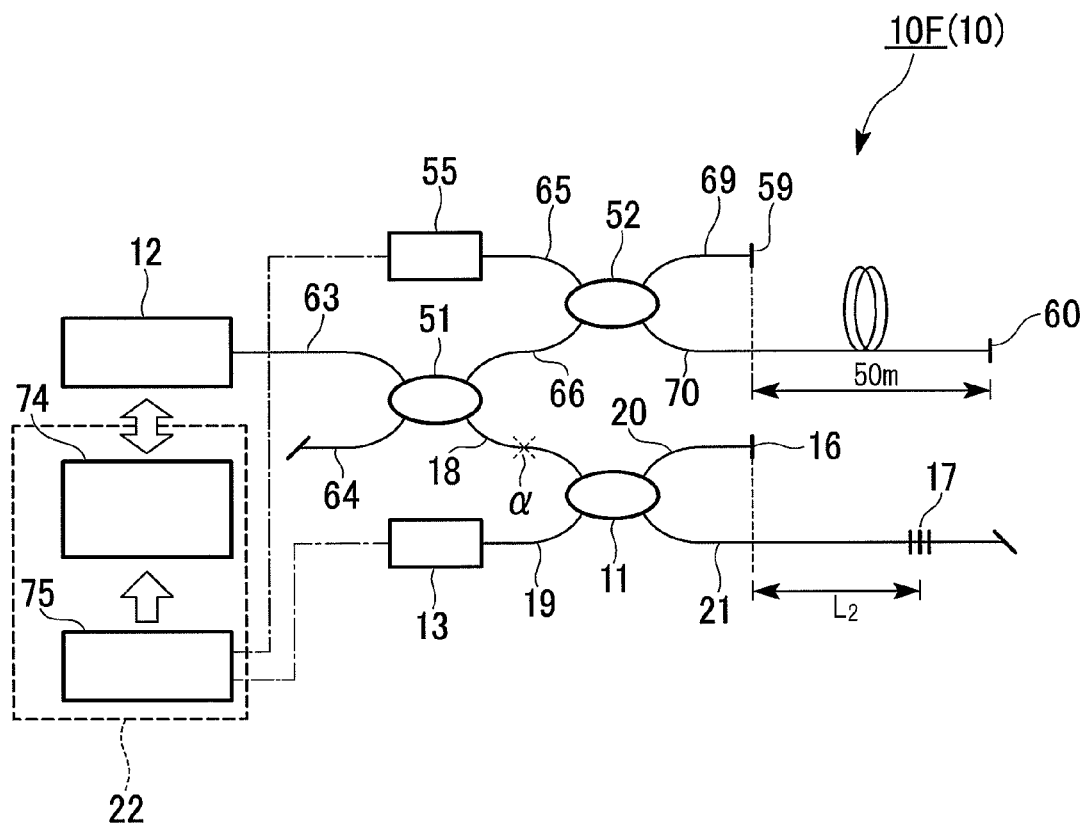
FIG. 7 is a schematic configuration view showing the physical quantity measuring apparatus utilizing optical frequency domain reflectometry of Example 1 of the present invention.

FIG. 7 is a schematic configuration view that shows the physical quantity measuring apparatus utilizing OFDR 10F of Example 1. The present Example is constituted based on the physical quantity measuring apparatus utilizing OFDR 10A of the first embodiment described above. In FIG. 7, the same reference numerals are given to the constituent elements that are the same as the constituent elements of the physical quantity measuring apparatus utilizing OFDR of the first embodiment shown in FIG. 1, and so descriptions thereof is omitted.

The physical quantity measuring apparatus utilizing OFDR 10F of Example 1 further includes two PM couplers 51, 52, a photodiode 55, and two referential reflecting ends 59, 60 in the physical quantity measuring apparatus utilizing OFDR 10A shown in FIG. 1. These are arranged consecutively by PANDA type PM fibers 63, 64, 65, 66, 69, 70. Also, PANDA fibers are used as the first to fourth PM fibers.

The tunable laser 12 is connected with the system controller 74 via a general purpose interface bus (GPIB), and is further controlled thereby.

The signals from the two photodiodes (photodiode 13 and photodiode 55) are sampled by the A/D converter 75, and the sampled data is subjected to STFT analysis by the system controller 74. Regarding this analysis method, it is as disclosed in the aforementioned first embodiment.

As the PM coupler 11, 51, 52, PTAP-0150-2-B (model) made by Fujikura Ltd. is used.

As the tunable laser 12, 8164A (model) made by Agilent Ltd. is used.

As the photodiodes 13, 55, 2117F (model) made by New Focus Ltd. is used.

As the PANDA fibers 18, 19, 20, 21, 63, 64, 65, 66, 69, 70, SM-15-PS-U25A (model) made by Fujikura Ltd. is used.

As the system controller 74, PXI-8106 (model) made by National Instruments Ltd. is used.

As the A/D converter 75, PXI-6115 (model) made by National Instruments Ltd. is used.

The tunable laser 12 emits a single polarization measuring light being swept (monotonously increased or monotonously decreased) within a constant wavelength range at a constant speed.

In this Example 1, a measuring light being swept over a wavelength range of 1545 to 1555 nm at a speed of 10 nm/s is emitted. The single polarization measuring light that is emitted from the tunable laser 12 propagates through the slow axis of the PANDA fiber 63 and is inputted to the fiber coupler 51, and the optical power is split by this fiber coupler 51 and is inputted to two optical interferometers.

One of the aforementioned two optical interferometers basically consists of the fiber coupler 52, the referential reflecting ends 59, 60, and the first photodiode 55, and generates a trigger signals related to the fiber length difference (optical path-length difference) of the PANDA fiber 69 that has the referential reflecting end 59 and the PANDA fiber 70 that has the referential reflecting end 60. In this Example 1, the fiber length difference between the PANDA fiber 69 and the PANDA fiber 70 was set to be 50 m.

The trigger signals are generated by the following method.

When the measuring light that is swept within a constant wavelength range at a constant speed from the tunable laser 12 is inputted the optical interferometers, the measuring light is reflected by the referential reflecting ends 59 and 60, and the interference light thereof is measured by the photodiode 55. The signal that is acquired by the photodiode 55 is sampled by the A/D converter 75 and converted to a voltage signal, and this voltage signal is taken into the system controller 74. Since the wavelength of the measuring light that is emitted from the tunable laser 12 changes at a constant speed, the signal that is measured by the photodiode 55 becomes a sine function that fluctuates at a constant optical wavenumber interval. Accordingly, if a constant voltage value is used as a threshold value, and the system controller 74 generates the trigger signals at a timing that crosses this threshold value (a timing that crossed the threshold value from a value lower than the threshold value, or a timing that falls below the threshold value from a value above the threshold value), the generated trigger signals becomes a constant optical wavenumber interval.

This method of generating the trigger signals is extremely effective on the point of the optical wavenumber interval at which the trigger signals are generated always being constant even in the case of the sweep rate of the tunable laser 12 not being constant.

The other one of the aforementioned two optical interferometers has the schematic configuration of the first embodiment shown in FIG. 1.

The sensor 17 was manufactured by a general exposure method that uses a krypton fluoride (KrF) excimer laser and a uniform period phase mask. In Example 1, the grating length (sensor length) was set to be 5 mm. Also, the distance $L_2$ from the position corresponding to the PANDA fiber 71 that has the referential reflecting end 16 to the sensor 17 was set to be approximately 6.2 m.

Figure 8:
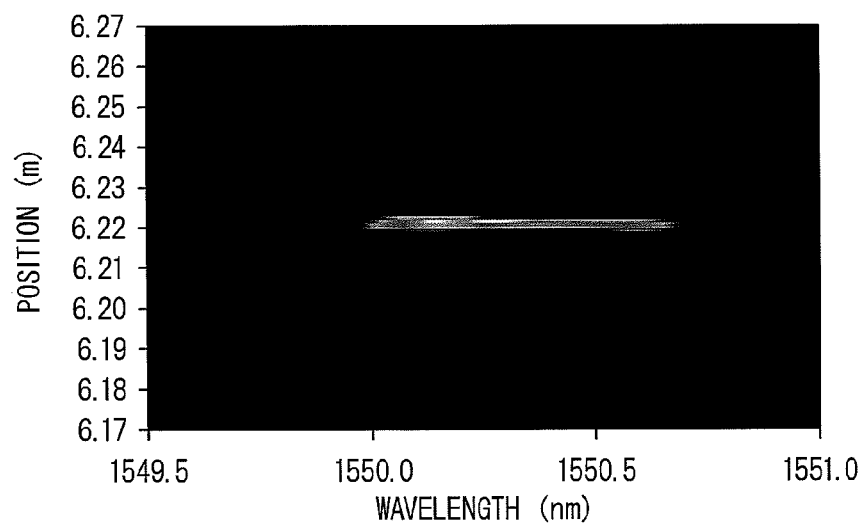
FIG. 8 is a spectrogram showing the measurement results of the state of the sensor using the same Example 1.

The state of the sensor 17 is measured using the physical quantity measuring apparatus utilizing OFDR 10F of the present example, the measuring result is shown in FIG. 8. In the physical quantity measuring apparatus utilizing OFDR, the Bragg reflected light from the sensor 17 is displayed as a spectrogram. In this spectrogram, the horizontal axis is the wavelength, the vertical axis is the position (fiber length $L_2$ from the position corresponding to the PANDA fiber 71 that has the referential reflecting end 16), and the color tone shows the Bragg reflection intensity. In this Example 1, the obtained optical interference signal $D_1$ is analyzed at the window width corresponding to an approximately 80 ms interval (since the tunable laser 12 is swept at a speed of 10 nm/s, when converted to a wavelength, it is approximately 800 pm interval).

From the result of FIG. 8, in Example 1, Bragg reflected lights from the slow axis and the fast axis of the sensor 17 are obtained. From this result, it is theoretically confirmed that it is possible to measure the temperature and strain without using a separate sensor for temperature compensation.

However, since the Bragg reflected light from the slow axis of the sensor 17 and the Bragg reflected light from the fast axis of the sensor 17 overlap with the wavelength axis, it is difficult to individually identify the Bragg reflected light from the two orthogonal polarization axes in the sensor 17. Thereby, the wavelength analysis accuracy is reduced. This means that the temperature and strain measurement accuracy is reduced.

Also, although it is small, it have been confirmed that the fiber position of the Bragg reflected lights from the slow axis and the fast axis of the sensor 17 had shifted. Specifically, the position of the Bragg reflected light from the slow axis was approximately 6.222 m, and the position of the Bragg reflected light from the fast axis was approximately 6.221 m. This is because the positions of the Bragg reflected light from the respective polarization axes end up being measured in a shifted state as a result of analyzing the effective refractive indices of the two orthogonal polarization axes that originally differ unified to $n_{slow}$.

Next, the dependence of the positional deviation amount $\Delta l$ of the Bragg reflected light from the slow axis and the fast axis of the sensor 17 on $L_2$ was calculated. The result is shown in FIG. 9.

Figure 9:
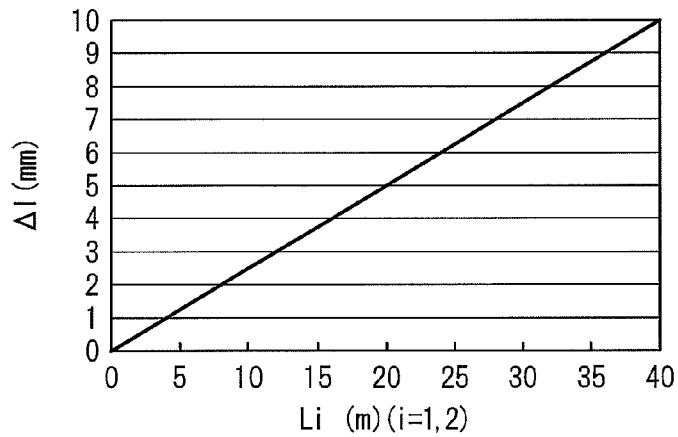
FIG. 9 is a graph that shows the result of calculating the dependence of the positional deviation amount Δl of the Bragg reflected light from the slow axis and the fast axis of the sensor on the fiber length $L_2$ to the sensor.

This FIG. 9 is obtained by the below Equation (10).

$$n_{slow}\Delta l = n_{slow}L_2 - n_{fast}L_2 \qquad (10)$$

$$\therefore \Delta l = \frac{(n_{slow} - n_{fast})L_2}{n_{slow}}$$

At this time, the length of the sensor 17 is sufficiently short with respect to $L_2$, and thus can be negligible.

In the aforementioned Equation (10), $n_{slow}$ and $n_{fast}$ are values obtained from the wavelength of the Bragg reflected light of the sensor 17 and the grating period that is calculated from the interval of the diffraction grating of the uniform period phase mask used in manufacture of the sensor 17, based on equation (11) below, and used $n_{slow}$=1.44756, $n_{fast}$=1.44720.

$$\left. \begin{array}{l} n_{slow} = \dfrac{\lambda_{slow}}{2\Lambda} \\ n_{fast} = \dfrac{\lambda_{fast}}{2\Lambda} \end{array} \right\} \qquad (11)$$

In the abovementioned Equation (11), $\lambda_{slow}$ and $\lambda_{fast}$ represent the wavelength of the Bragg reflected light from the two orthogonal polarization axes of the sensor 17, and $\Lambda$ represents the grating period that is calculated from the interval of the diffraction grating of the uniform period phase mask.

From the result of FIG. 9, when $L_2$ is set to be 6.2 m, Δl is calculated as 1.55 mm. That is, in FIG. 8 that shows the measuring result of the state of the sensor using the physical quantity measuring apparatus utilizing OFDR 10F of the present embodiment, the position at which the Bragg reflected light from the fast axis appears is shifted 1.55 mm from the position at which the Bragg reflected light from the slow axis appears.

Therefore, Example 2 was manufactured that can individually identify and measure the Bragg reflected lights from the two orthogonal polarization axes in the sensor 17, and measurement was performed.

Example 2

Figure 10:
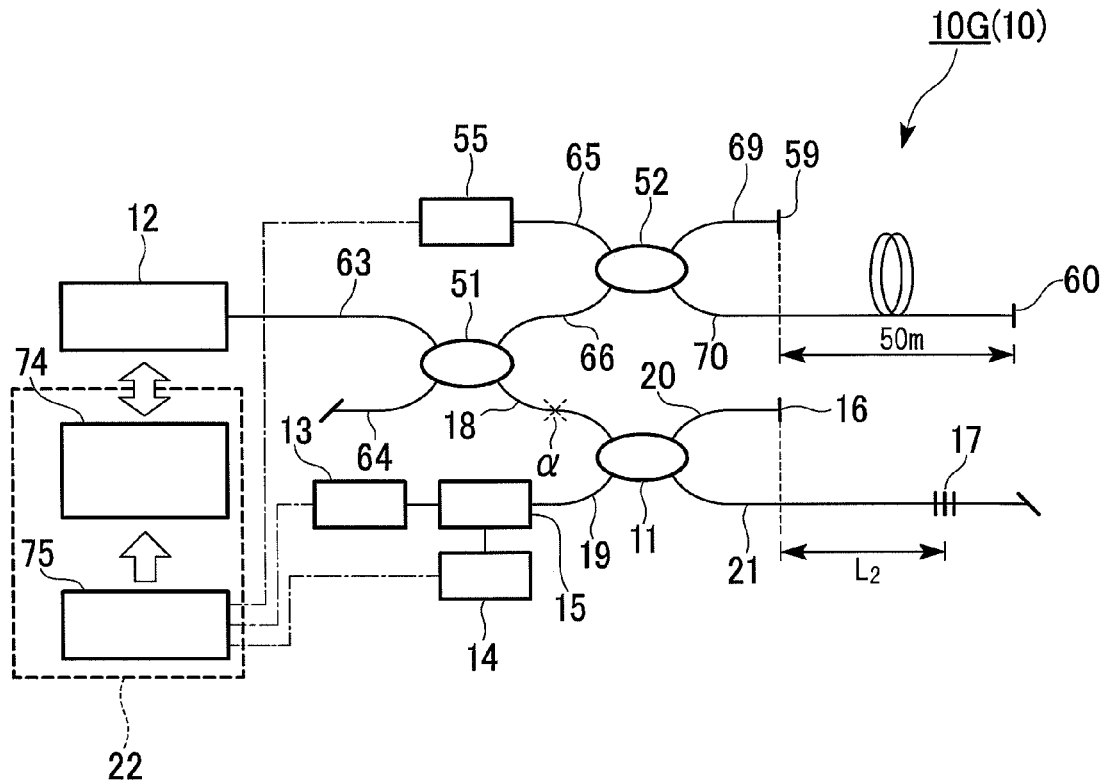
FIG. 10 is a schematic configuration view showing the physical quantity measuring apparatus utilizing optical frequency domain reflectometry of Example 2 of the present invention.

FIG. 10 is a schematic configuration view that shows the physical quantity measuring apparatus utilizing OFDR 10G of Example 2. The present Example 2 differs from the Example 1 in that it was manufactured based on the aforementioned physical quantity measuring apparatus utilizing OFDR of the second embodiment. That is, the present example differs from Example 1 in that the polarization beam splitter 15 that splits the Bragg reflected light from the sensor 17 is further disposed in the fourth PM fiber 19, and the first photodiode 13 and the second photodiode 14 being connected with this polarization beam splitter 15. In the present example, the signals from the three photodiodes 13, 14, 55 are sampled by the A/D converter 75, and that sampled data is subjected to STFT analysis in the system controller 74.

Figure 11:
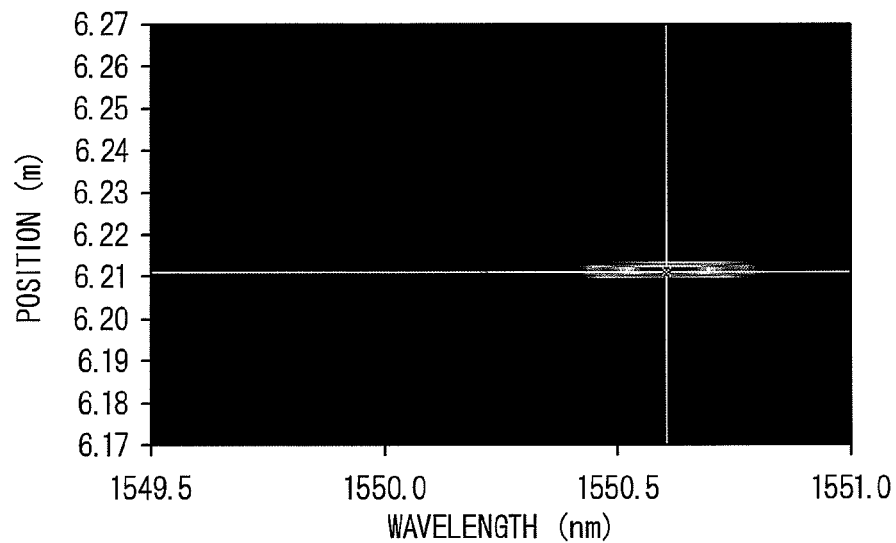
FIG. 11 is a spectrogram showing the measurement results of the state of the sensor using the same Example 2.
Figure 12:
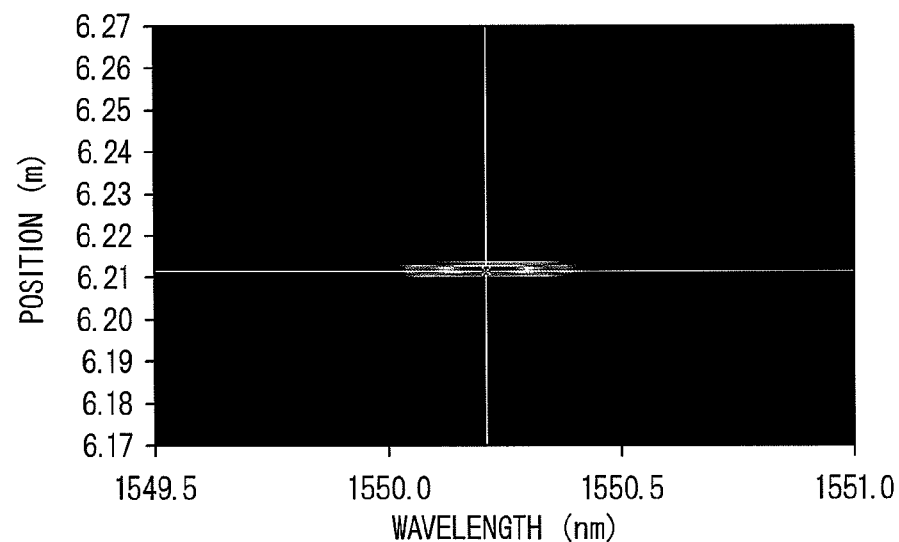
FIG. 12 is a spectrogram showing the measurement results of the state of the sensor using the same Example 2.

The result of measuring the state of the sensor 17 using the physical quantity measuring apparatus utilizing OFDR 10G is shown in FIGS. 11 and 12.

FIG. 11 is a spectrogram that shows the result of analyzing the optical interference signal $D_2$ that is inputted to the first photodiode 13. FIG. 12 is a spectrogram that shows the result of analyzing the optical interference signal $D_3$ that is inputted to the second photodiode 14.

In the spectrogram shown in FIG. 11, the Bragg reflected light of 1550.6 nm is from the slow axis of the sensor 17. In the spectrogram shown in FIG. 12, the Bragg reflected light of 1550.2 nm is from the fast axis of the sensor 17. The positions of these two Bragg reflected lights are both approximately 6.212 m.

In this Example 2, the optical interference signal $D_2$ and the optical interference signal $D_3$ are individually analyzed, but the two signals that are obtained in this one measurement are processed in parallel by the system controller 74.

In this Example 2, since Bragg reflected light from the two orthogonal polarization axes of the sensor 17 was obtained, theoretically it is possible to measure the temperature and strain. Thereby, in the case of performing strain measurement using the physical quantity measuring apparatus utilizing OFDR 10G of the present example, a temperature compensation sensor is not required. Also, since optical interference signals are obtained at the photodiodes 13 and 14 respectively, by splitting the Bragg reflected light from the two orthogonal polarization axes of the sensor 17, it is possible to individually identify and measure the respective change amounts of the Bragg reflected light from the two orthogonal polarization axes of the sensor 17. Thereby, it is possible to improve the wavelength analysis accuracy of the Bragg reflected light from the two orthogonal polarization axes of the sensor 17. This means that the temperature and strain measurement accuracy improves. Moreover, since $L_2$ is obtained by substituting the known $n_{slow}$ and $n_{fast}$ into the obtained two optical path-lengths $n_{slow}L_2$ and $n_{fast}L_2$ obtained in the respective measurements, it is possible to accurately specify the position of the sensor 17, and it is possible to perform measurement with a high resolution.

Next, using the physical quantity measuring apparatus utilizing OFDR 10G of the present example, strain was applied to the sensor 17 at the reference temperature (20° C.), and the strain dependence of the Bragg wavelength change on the slow axis and the fast axis in the sensor 17 was measured. Also, using the physical quantity measuring apparatus utilizing OFDR 10G of the present example, by applying a temperature change to the sensor 17 at the reference strain (0 με), and by measuring the temperature change dependence of the Bragg wavelength change on the slow axis and the fast axis in the sensor 17, each item of the aforementioned Equation (3) at the sensor 17 was obtained, whereupon the following Equation (12) was obtained. By performing a calculation using this Equation (12), the D value in the aforementioned Equation (3) was D=−6.39×10⁻⁷ (nm²/με·° C.).

$$\left. \begin{array}{l} \frac{\partial \lambda_{fast}}{\partial \varepsilon} = 0.001244 \text{ nm/με} \\ \frac{\partial \lambda_{slow}}{\partial T} = 0.010640 \text{ nm/° C.} \\ \frac{\partial \lambda_{fast}}{\partial T} = 0.011003 \text{ nm/° C.} \\ \frac{\partial \lambda_{slow}}{\partial \varepsilon} = 0.001261 \text{ nm/με} \end{array} \right\} \quad (12)$$

By substituting $\Delta\lambda_{slow}$ and $\Delta\lambda_{fast}$ obtained from the measurement result and the aforementioned D into the aforementioned Equation (3) and performing calculation, ΔT and Δε are obtained, and if the reference temperature and the reference strain are subtracted from these values, it is possible to obtain the temperature and strain in the detection portion.

These calculations can be easily performed by using the system controller 74 of the physical quantity measuring apparatus utilizing OFDR.

Example 3

Besides the sensor 17 that consists of an FBG being formed in the PANDA fiber in which the effective refractive index difference of the slow axis and the fast axis (birefringence) is large, a physical quantity measuring apparatus utilizing OFDR 10H was manufactured similarly to the Example 2, and this is used as Embodiment 3.

Figure 13:
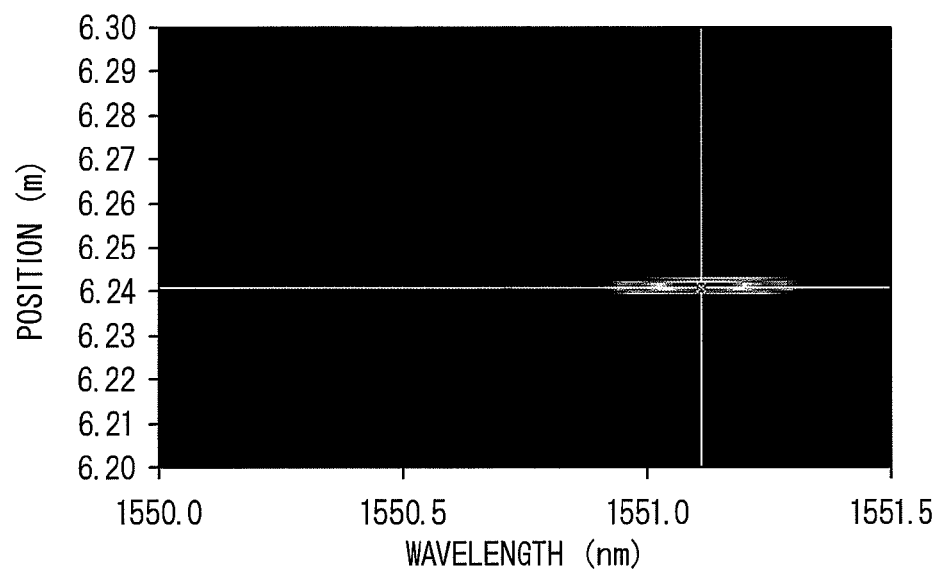
FIG. 13 is a spectrogram showing the measurement results of the state of the sensor using the physical quantity measuring apparatus utilizing optical frequency domain reflectometry of Example 3 of the present invention.
Figure 14:
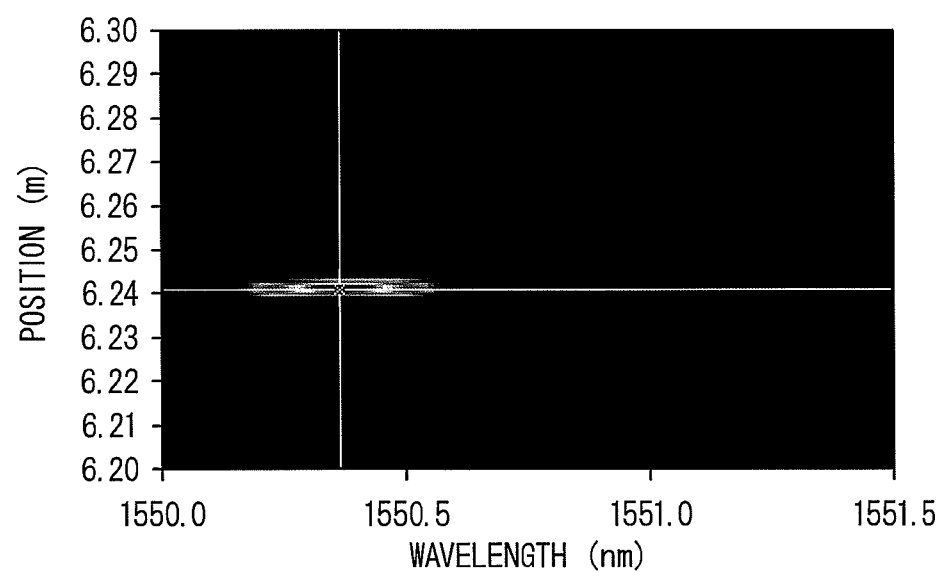
FIG. 14 is a spectrogram showing the measurement results of the state of the sensor using the same Example 3.

The result of measuring the state of the sensor 17 using the physical quantity measuring apparatus utilizing OFDR 10H is shown in FIG. 13 and FIG. 14.

FIG. 13 is a spectrogram that shows the result of analyzing the optical interference signal $D_2$ that is inputted to the first photodiode 13. FIG. 14 is a spectrogram that shows the result of analyzing the optical interference signal $D_3$ that is inputted to the second photodiode 14.

In the spectrogram shown in FIG. 13, the Bragg reflected light of 1551.1 nm is one that consists of the slow axis of the sensor 17. In the spectrogram shown in FIG. 14, the Bragg reflected light of 1550.4 nm is one that consists of the fast axis of the sensor 17. The positions of these two Bragg reflected lights are both approximately 6.2408 m.

As a result of analyzing in greater detail the spectrogram of the sensor 17 obtained in Example 3, the Bragg wavelength difference of the slow axis and the fast axis was 0.661 nm, and the birefringence calculated from this Bragg wavelength difference was 6.19×10⁻⁴. Meanwhile, the Bragg wavelength difference obtained by analyzing in greater detail the spectrogram of the sensor 17 obtained in Example 2 was 0.361 nm, and the birefringence calculated from this Bragg wavelength difference was $3.37 \times 10^{-4}$. That is, the PANDA file that constitutes the sensor 17 of the Example 3 has birefringence that is close to twice that of the PANDA fiber that constitutes the sensor 17 of the Example 2.

Next, using the physical quantity measuring apparatus utilizing OFDR 10H of the present example, strain was applied to the sensor 17 at the reference temperature (20° C.), and the strain dependence of the Bragg wavelength change on the slow axis and the fast axis in the sensor 17 was measured. Also, using the physical quantity measuring apparatus utilizing OFDR 10H of the present example, a temperature change is applied to the sensor 17 at the reference strain (0 µε), and the temperature change dependence of the Bragg wavelength change on the slow axis and the fast axis in the sensor 17 is measured. Therefore, each item of the aforementioned Equation (3) in the sensor 17 was obtained, whereupon the following Equation (13) was obtained. By performing calculation using this, the D value in the aforementioned Equation (3) was $D=-10.02 \times 10^{-7}$ (nm$^2$/µε·° C.).

$$\left. \begin{array}{l} \frac{\partial \lambda_{fast}}{\partial \varepsilon} = 0.001253 \text{ nm/µε} \\ \frac{\partial \lambda_{slow}}{\partial T} = 0.010441 \text{ nm/° C.} \\ \frac{\partial \lambda_{fast}}{\partial T} = 0.011090 \text{ nm/° C.} \\ \frac{\partial \lambda_{slow}}{\partial \varepsilon} = 0.001270 \text{ nm/µε} \end{array} \right\} \quad (13)$$

When calculating the temperature and strain using the aforementioned Equation (3), the greater difference between $\partial \lambda_{slow}/\partial \varepsilon$ and $\lambda_{fast}/\partial \varepsilon$ and the greater difference between $\partial \lambda_{slow}/\partial T$ and $\lambda_{fast}/\partial T$, enable the calculation of the temperature and strain to obtain high accuracy result. In which, the difference between $\partial \lambda_{slow}/\partial \varepsilon$ and $\lambda_{fast}/\partial \varepsilon$ represents the shift characteristic difference of the Bragg wavelength with respect to the strain of the slow axis and the fast axis, and the difference between $\partial \lambda_{slow}/\partial T$ and $\lambda_{fast}/\partial T$ represents the shift characteristic difference of the Bragg wavelength with respect to the temperature change of the slow axis and the fast axis. It should be noted that the difference between $\partial \lambda_{slow}/\partial T$ and $\lambda_{fast}/\partial T$ obtained in the aforementioned Equation (13) is greater than that in the aforementioned Equation (12).

Specifically, while the aforementioned Equation (12) obtained in Example 2 is $-3.63 \times 10^{-4}$ nm/° C., the aforementioned Equation (13) obtained in Example 3 is $-6.49 \times 10^{-4}$ nm/° C. That is, the sensor 17 of Example 3 has nearly twice the shift characteristic difference of the Bragg wavelength with respect to the temperature change compare to the sensor 17 of Example 2. This is caused by the difference in the birefringence of the PANDA fibers that constitute the respective sensors.

It is known that the birefringence generated at the core of PANDA fiber decreases in proportion to the increase in temperature, and becomes nearly zero at a temperature of 800 to 900° C. That is, the greater the birefringence at the reference temperature, the amount of decrease of the birefringence increases per unit of temperature increase. Accordingly, the sensor 17 of Example 3 has nearly twice the shift characteristic difference of the Bragg wavelength with respect to the temperature change compared to the sensor 17 of Example 2.

Next, Table 1 shows the result of applying an arbitrary temperature change and strain to the sensor 17 of Example 3, and measuring the temperature change and strain by the physical quantity measuring apparatus utilizing OFDR 10H of Example 3.

TABLE 1

| | | Setting Temperature Change | | | | | |
|---|---|---|---|---|---|---|---|
| | | 20° C. | | 40° C. | | 100° C. | |
| | | Measurement Value | Error | Measurement Value | Error | Measurement Value | Error |
| Setting Strain | 250 µε | 18.5° C. | −1.5° C. | 38.1° C. | −1.9° C. | 99.9° C. | −0.1° C. |
| | | 245 µε | −5 µε | 243 µε | −7 µε | 246 µε | −4 µε |
| | 500 µε | 19.9° C. | −0.1° C. | 39.5° C. | −0.5° C. | 100.0° C. | ±0° C. |
| | | 482 µε | −18 µε | 488 µε | −12 µε | 490 µε | −10 µε |
| | 1000 µε | 19.5° C. | −0.5° C. | 38.9° C. | −1.1° C. | 99.5° C. | −0.5° C. |
| | | 991 µε | −9 µε | 984 µε | −16 µε | 994 µε | −6 µε |

From the result of Table 1, the temperature change was set to 20, 40 and 100° C. (that is, setting temperatures 40, 60, 120° C.) from the reference temperature (20° C.), and the strain was set to 250, 500, 1000 µε from the reference strain (0 µε), so that the temperature and strain was measured under a total of nine conditions, as a result, temperature and strain measured simultaneously with an extremely high accuracy, temperature error is 2° C. and strain error is 20 µε.

Figure 15:
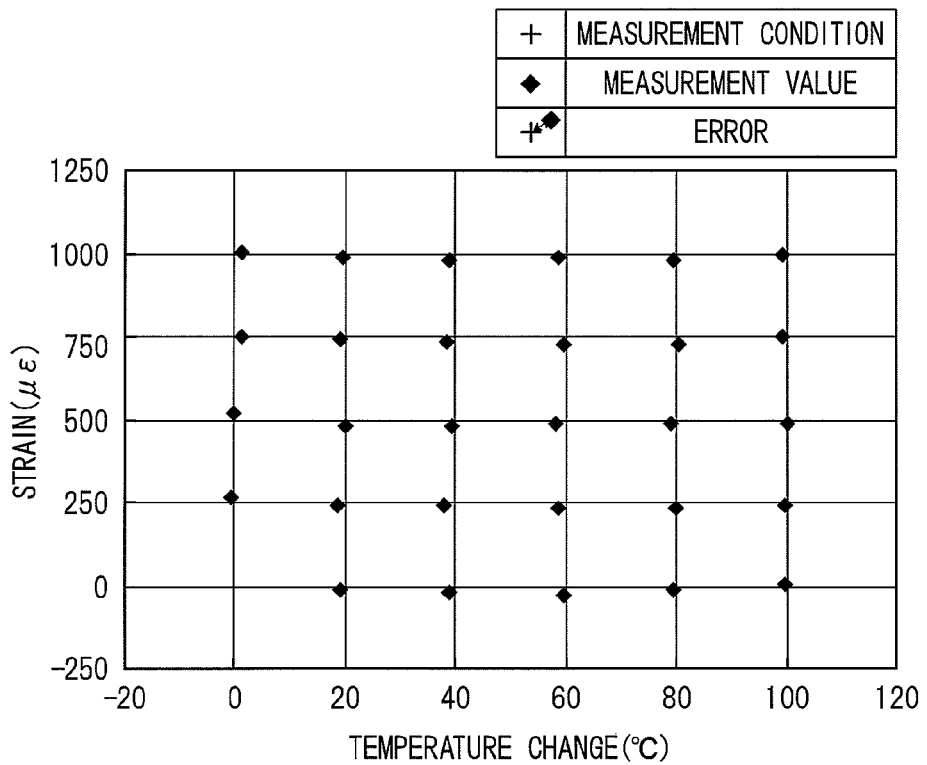
FIG. 15 is a graphical representation of the result of simultaneously measuring the temperature and strain by increasing the measurement points in Example 3.

FIG. 15 is a graphical representation of simultaneously measuring result by increasing the measurement points from Table 1. The intersection of the straight lines in the graph shows the measurement conditions, and a red plot shows a measurement result. That is, misalignment between the plot and the intersection shows a measurement error. From this result, it could be confirmed that in any measurement condition, it is possible to simultaneously measure the temperature change and strain with high accuracy.

According to the Example 3 explained above, the sensor that consists of an FBG used in the physical quantity measuring apparatus utilizing OFDR of the present invention is preferably constituted from PANDA fibers with has large birefringence. As a result of detailed examination in relation to simultaneous measurement accuracy of temperature change and strain of a sensor that consists of an FBG it was obtained that the shift characteristics difference of the Bragg wavelength with respect to the temperature change of this sensor preferably has a shift characteristics that is greater than $-5.0 \times 10^{-4}$ nm/° C.

Figure 16:
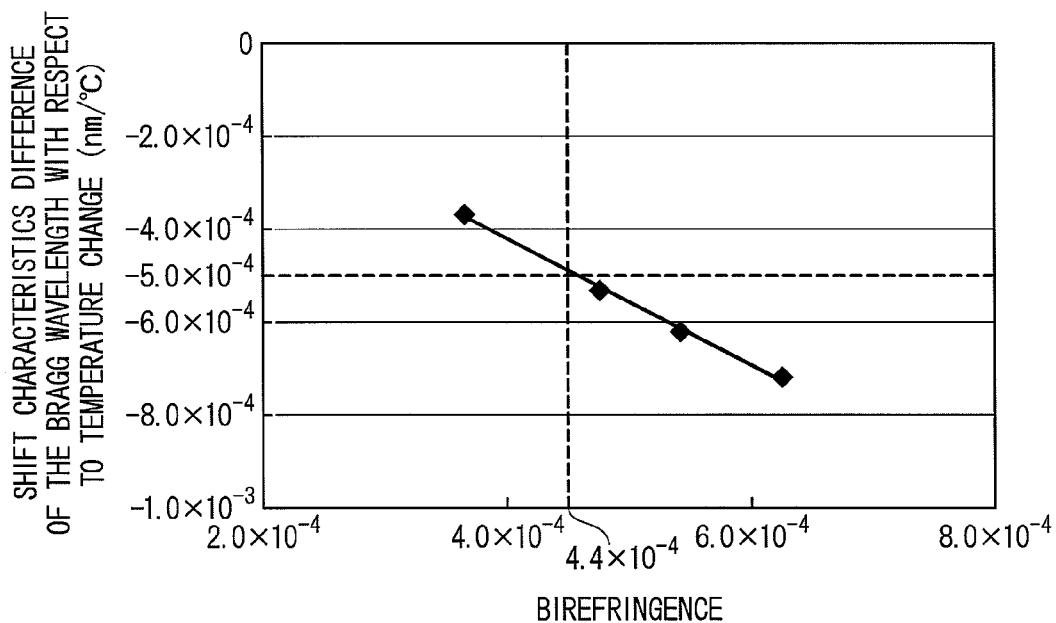
FIG. 16 is a graph showing the birefringence of a PANDA fiber and the shift characteristics difference of the Bragg wavelength with respect to the temperature change of this sensor which consists of FBG that is constituted by this fiber.

FIG. 16 is a graph that shows the result of evaluating the birefringence of a PANDA fiber and the shift characteristics difference of the Bragg wavelength with respect to the temperature change of this sensor that consists of FBG that is constituted by this fiber.

From this result, when the birefringence of the PANDA fiber is not less than $4.4\times10^{-4}$, the shift characteristics difference of the Bragg wavelength with respect to the temperature change of this sensor has the shift characteristics that are greater than $-5.0\times10^{-4}$ nm/° C. That is, the birefringence of the PANDA fiber is preferably not less than $4.4\times10^{-4}$.

In the present example, in order to make the shift characteristics difference of the Bragg wavelength with respect to the temperature change of this sensor that consists of an FBG greater than $-5.0\times10^{-4}$ nm/° C., a PANDA fiber was used that brings the stress-applying parts close to the core, but other PANDA fibers that are capable of realizing the present invention include a PANDA fiber provided with stress-applying parts of a low melting point. More specifically, in the case of the melting point of the stress-applying parts being 600° C. or less, it is possible to make the shift characteristics of the Bragg wavelength greater than $-5.0\times10^{-4}$ nm/° C.

Example 4

A physical quantity measuring apparatus utilizing OFDR 10I was manufactured similarly to the Example 3, except that the grating length (sensor length) of the sensor 17 was 100 nm, and this is used as Example 4.

When the state of the sensor was measured using the physical quantity measuring apparatus utilizing OFDR 10I of the present example, the Bragg reflected light from the slow axis of the sensor 17 was 1549.4 nm, and the Bragg reflected light from the fast axis of the sensor 17 was 1548.7 nm.

The Bragg wavelength difference obtained by analyzing in greater detail the spectrogram obtained at this time was 0.670 nm. Since this Bragg wavelength difference is equivalent with Example 3, the birefringence of the sensor of the present example is equivalent with Example 3.

Figure 17:
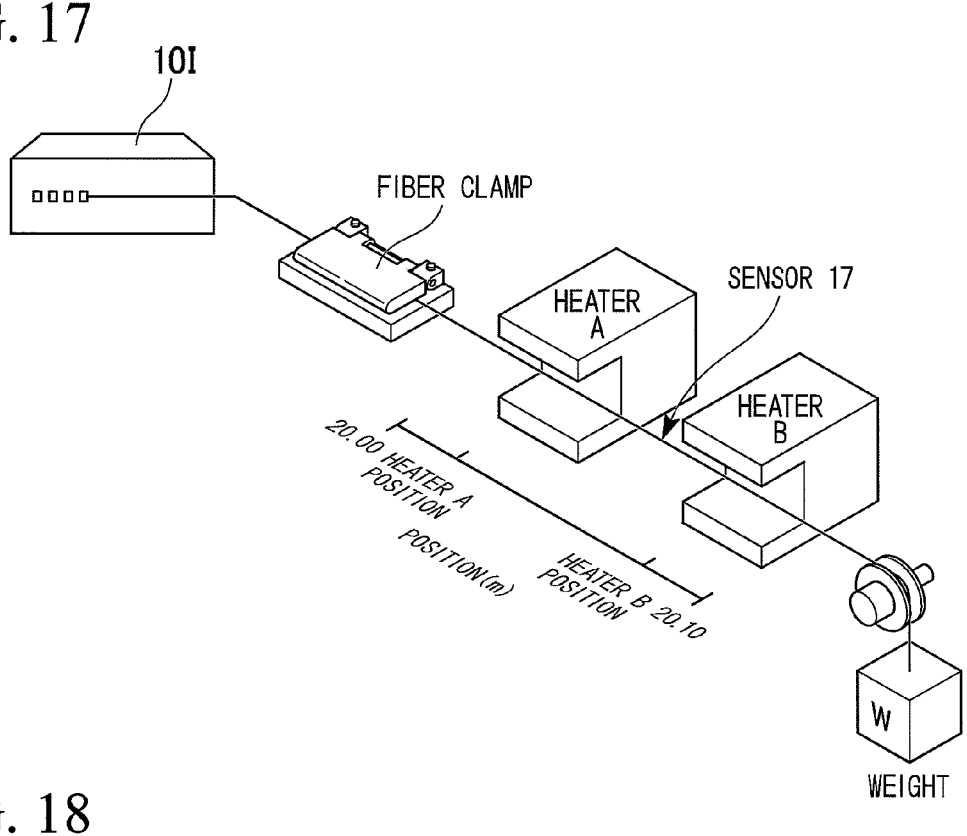
FIG. 17 is a schematic view showing the experimental system for measuring the temperature distribution and strain that occurs in the sensor in the Example 4 of the present invention.

FIG. 17 is a schematic view showing the experiment system for measuring the temperature distribution and strain that occurs in the sensor using the physical quantity measuring device utilizing OFDR 10I of the present example. In this experiment system, it is possible to apply uniform strain along the long direction (longitudinal direction) of the sensor with a weight W, and it is possible to apply a non-uniform temperature change along the long direction of the sensor with a heater A and a heater B that can be independently controlled.

In the experiment system shown in FIG. 17, the strain applied to the sensor by the weight W is made to be constant at 1000 με. Also, the temperature change that is applied to the sensor by the heater A is made to be constant at 100° C. Only the temperature change that is applied to the sensor by the heater B is varied from 0 to 100° C., and the result of measuring the temperature change and strain at the position of the heater A and the position of the heater B is shown in FIG. 18.

Figure 18:
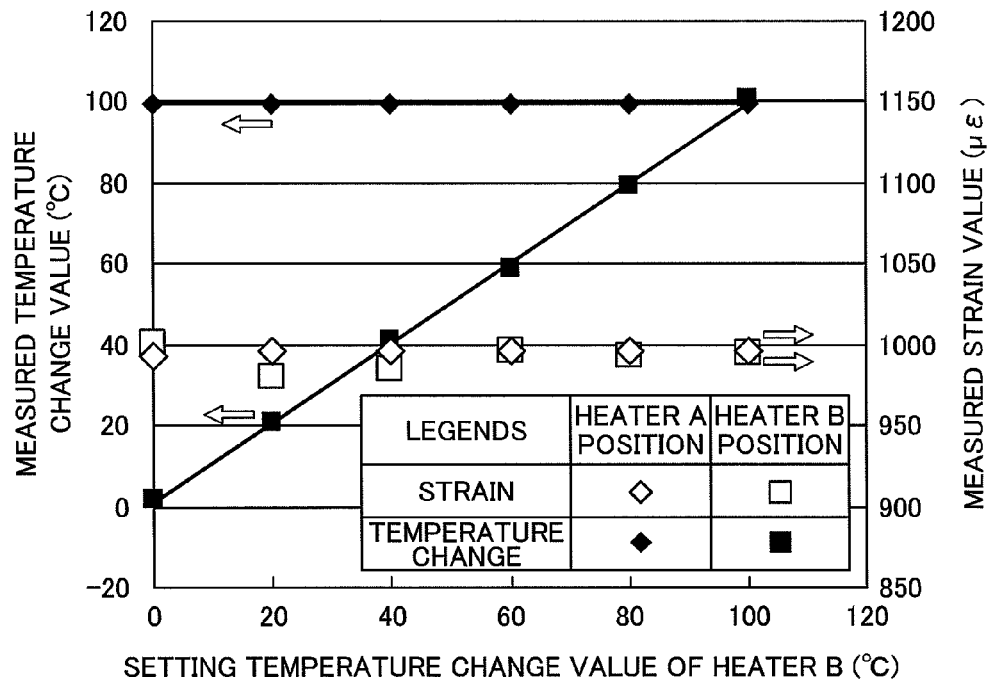
FIG. 18 is a graph showing the measurement results of the temperature change and strain at the position of the heater A and the position of the heater B in the same Example 4.

From FIG. 18, at the position of the heater A, the measured strain and temperature change were constant at 1000 με and 100° C., respectively. At the position of the heater B, a result was obtained in which the measured strain was constant at 1000 με, while the measured temperature change of the heater B changed in correlation with the setting temperature of the heater B. That is, the temperature distribution and strain that occur at the position of the heater A and the position of the heater B can be measured with high accuracy.

As described above, according to the present example, the present invention can simultaneously measure the temperature distribution and strain along the long direction of the sensor that consists of an FBG with high accuracy. Also, by using the present invention, even in the case of temperature distribution and strain distribution occurring along the long direction of the sensor that consists of an FBG, it is possible to simultaneously measure them with high accuracy.

Comparative Example 1

Besides setting the polarization axis angle offset fusion splice of the incidence part α to 0°, a physical quantity measuring apparatus utilizing OFDR was manufactured similarly to the Example 2, and this is used as Comparative Example 1. Using this Comparative Example 1, the state of the sensor 17 was measured. The results are shown in FIGS. 19 and 20.

Figure 19:
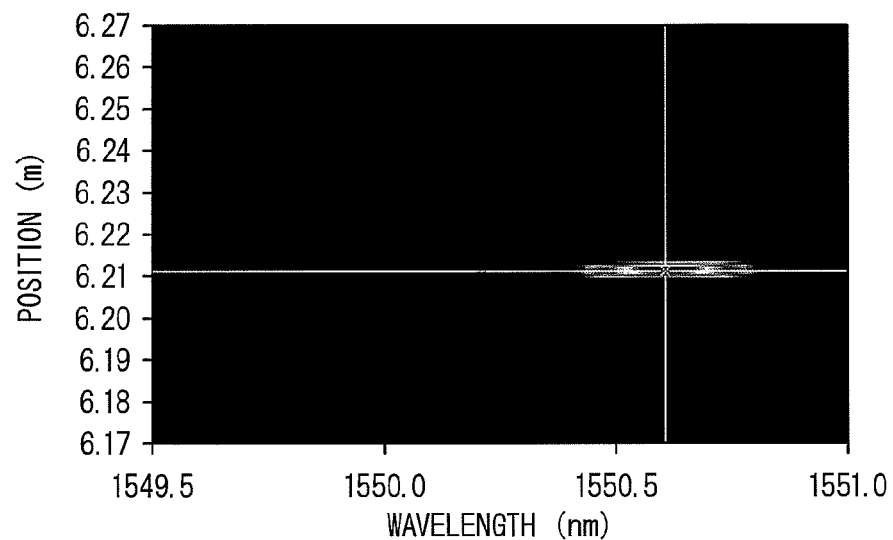
FIG. 19 is a spectrogram showing the measurement results of the state of the sensor using the physical quantity measuring apparatus utilizing optical frequency domain reflectometry of Comparative Example 1.

FIG. 19 is a spectrogram that shows the result of analyzing the optical interference signal $D_2$ that is inputted to the first photodiode 13. FIG. 20 is a spectrogram that shows the result of analyzing the optical interference signal $D_3$ that is inputted to the second photodiode 14.

Figure 20:
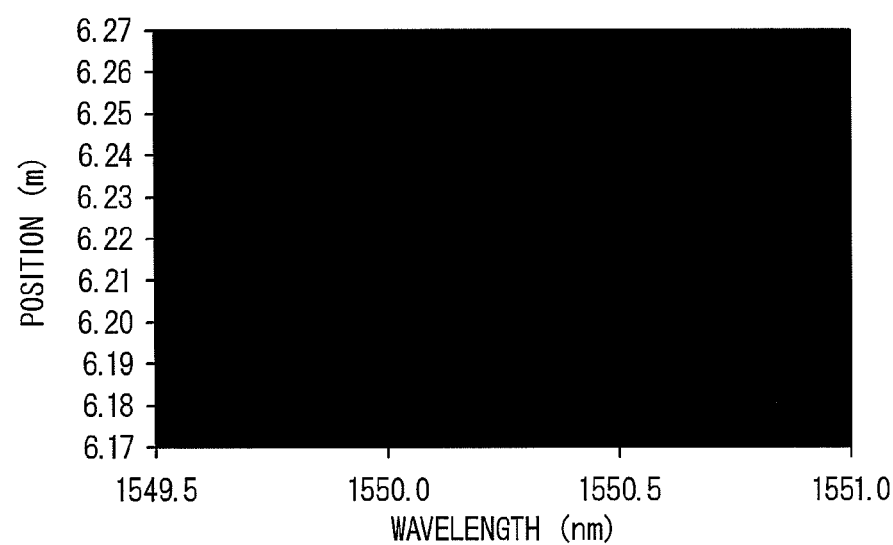
FIG. 20 is a spectrogram showing the measurement results of the state of the sensor using the same Comparative Example 1.

From the results of FIG. 19 and FIG. 20, in this Comparative Example 1, only Bragg reflected light from the slow axis of the sensor 17 was obtained. With the Bragg reflected light from the one polarization axis, it is not possible to measure the temperature and strain of the sensor 17. Accordingly, in the case of performing strain measurement using the physical quantity measuring apparatus utilizing OFDR of the Comparative Example 1, a sensor for temperature compensation is required.

Example 5

Figure 21:
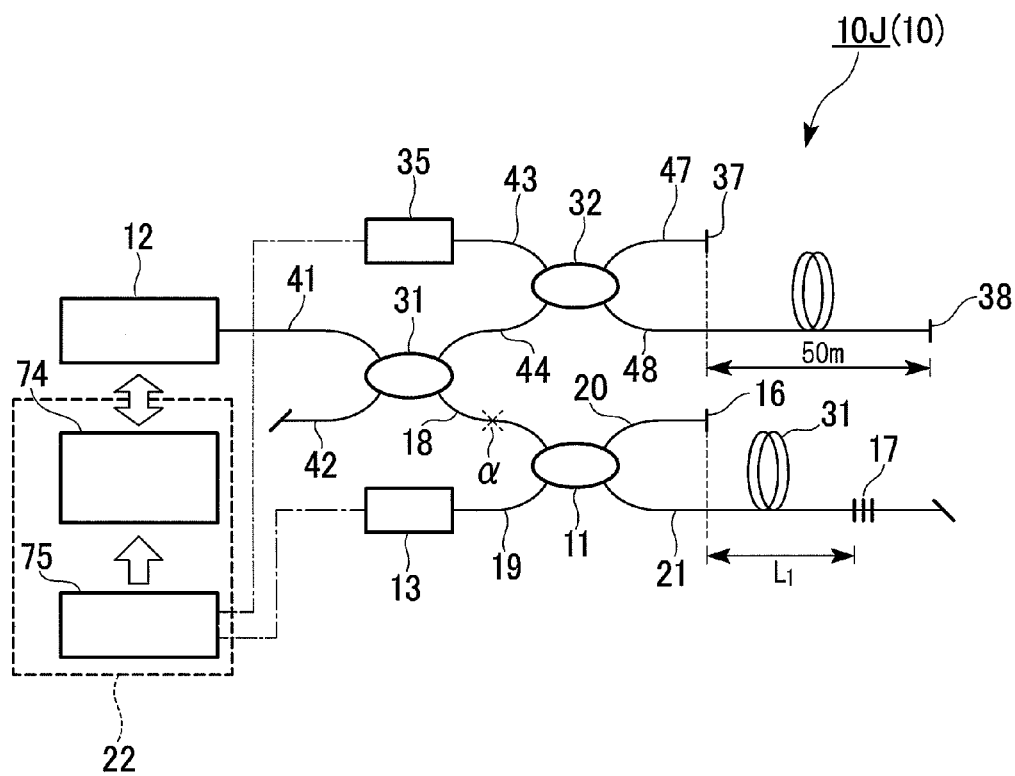
FIG. 21 is a schematic configuration view showing the physical quantity measuring apparatus utilizing optical frequency domain reflectometry of Example 5 of the present invention.

Besides providing an extension fiber 31 for making the optical path-length difference of the Bragg reflected light from the two orthogonal polarization axes in the sensor longer than the optical path-length corresponding to the length of the sensor, between the sensor 17 and the PM coupler 11, a physical quantity measuring apparatus utilizing OFDR was manufactured similarly to the Example 1, and this is used as Example 5. FIG. 21 is a schematic configuration view showing the physical quantity measuring apparatus utilizing OFDR 10J of the present example. The length $L_1$ of the extension fiber 31 is set to be approximately 20 m.

Figure 22:
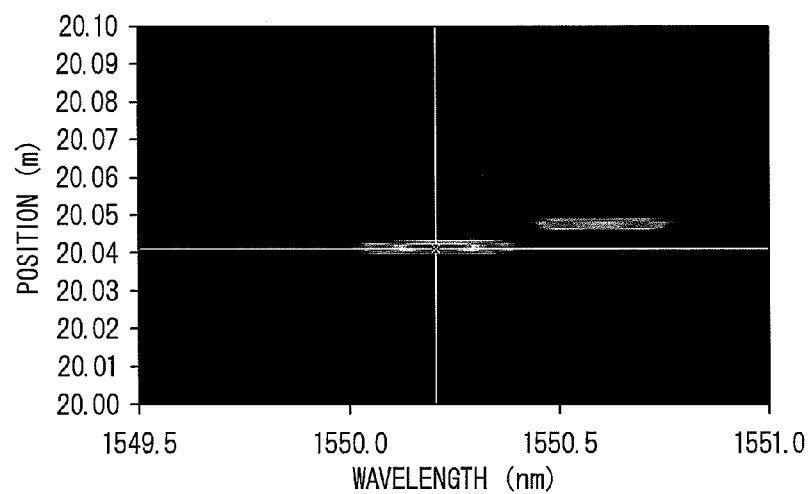
FIG. 22 is a spectrogram showing the measurement result of the state of the sensor using the same Example 5.

The result of measuring the state of the sensor 17 using the physical quantity measuring apparatus utilizing OFDR 10J of the present example is shown in FIG. 22.

In the spectrogram shown in FIG. 22, the Bragg reflected light of 1550.6 nm is from the slow axis of the sensor 17, and the Bragg reflected light of 1550.2 nm is from the fast axis of the sensor 17. As a result of performing analysis by unifying the effective refractive indices of the two orthogonal polarization axes that originally differ to $n_{slow}$, the positions of the Bragg reflected light from the respective polarization axes is shifted, so that it is possible to individually identify and measure the respective change amounts without the Bragg reflected light overlapping with the wavelength axis.

Even in the present example, when the dependence of the positional deviation amount Δl of the Bragg reflected light from the slow axis and the fast axis of the sensor 17 on $L_1$ is calculated similarly to Example 1, the result shown in FIG. 9 is obtained. Therefore, when the horizontal axis of FIG. 9 is transposed from the length of $L_2$ to the length of $L_1$, when $L_1$ is set to be 20 m, Δl is calculated as 5.01 mm, and Δl becomes longer than the length (l), which is 5 mm, of the sensor 40 used in the present embodiment. When Δl becomes longer, as shown in the spectrogram of FIG. 22, it is possible to individually identify and measure the Bragg reflected light from the two orthogonal polarization axes in the sensor 17, without the Bragg reflected light overlapping with the wavelength axis.

Here, Δl being longer than 1 means that the optical path-length difference of the Bragg reflected light from the two orthogonal polarization axes in the sensor 17 is longer than the optical path-length corresponding to the sensor length. The length $L_1$ of the extension fiber 31 that satisfies this condition is the aforementioned Equation (1) that is a modification of Equation (10), with Δl regarded as 1.

In this Example 5, since Bragg reflected lights from the two orthogonal polarization axes in the sensor 17 are obtained, it is confirmed that it is theoretically possible to measure the temperature and strain simultaneously. Thereby, in the case of performing strain measurement using the physical quantity measuring apparatus utilizing OFDR 10J of the present example, a temperature compensation sensor is not required. Also, since the extension fiber 31 is provided so that the Bragg reflected lights from the two orthogonal polarization axes in the sensor 17 do not overlap with the wavelength axis, it was confirmed that it is possible to individually identify and measure the respective change amounts of the Bragg reflected lights from the two orthogonal polarization axes in the sensor 17. Thereby, it is possible to improve the temperature and strain measurement accuracy in the sensor 17.

Embodiment 6

Figure 23:
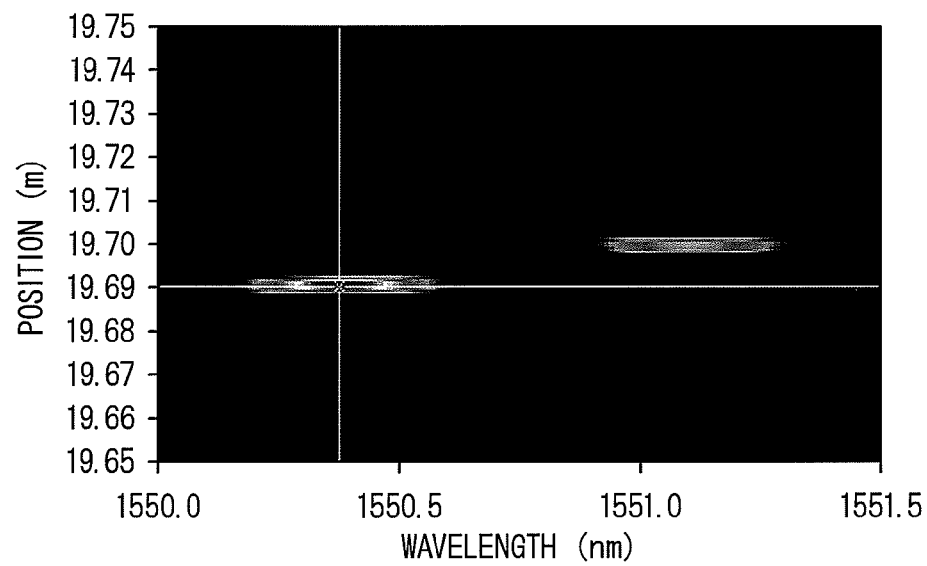
FIG. 23 is a spectrogram showing the measurement result of the state of the sensor using the physical quantity measuring apparatus utilizing optical frequency domain reflectometry of Embodiment 6 of the present invention.

Besides the sensor 17 that consists of an FBG being formed by the PANDA fiber in which the effective refractive index difference of the slow axis and the fast axis (birefringence) is large, a physical quantity measuring apparatus utilizing OFDR was manufactured similarly to the Example 5, and this is used as Example 6. The result of measuring the state of the sensor 17 using the physical quantity measuring apparatus utilizing OFDR of this example is shown in FIG. 23. In this result, a Bragg wavelength difference that is the same as the Example 3 was obtained. That is, the birefringence of the sensor 17 of the present example is equivalent to Example 3. Even in Example 6, a simultaneous measuring result of temperature and strain with the same accuracy as the Example 3 was obtained.

Comparative Example 2

Besides setting the polarization axis angle offset fusion splice of the incidence part α to 0°, a physical quantity measuring apparatus utilizing OFDR was manufactured similarly to the Example 5, and this is used as Comparative Example 2. Using this Comparative Example 2, the state of the sensor 17 was measured. The results are shown in FIG. 24.

Figure 24:
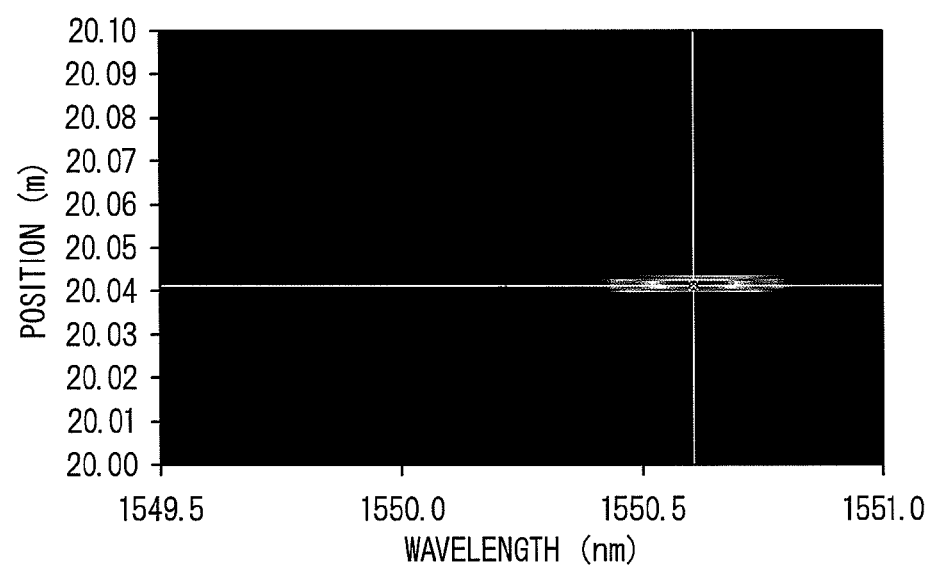
FIG. 24 is a spectrogram showing the measurement result of the state of the sensor using the physical quantity measuring apparatus utilizing optical frequency domain reflectometry of Comparative Example 2.

From the result of FIG. 24, in this Comparative Example 2, only Bragg reflected light from the slow axis of the sensor 17 was obtained. With the Bragg reflected light from the one polarization axis, it is not possible to measure the temperature and strain of the sensor 17. Accordingly, in the case of performing strain measurement using the physical quantity measuring apparatus utilizing OFDR of the Comparative Example 2, a sensor for temperature compensation is required.

Example 7

Figure 25:
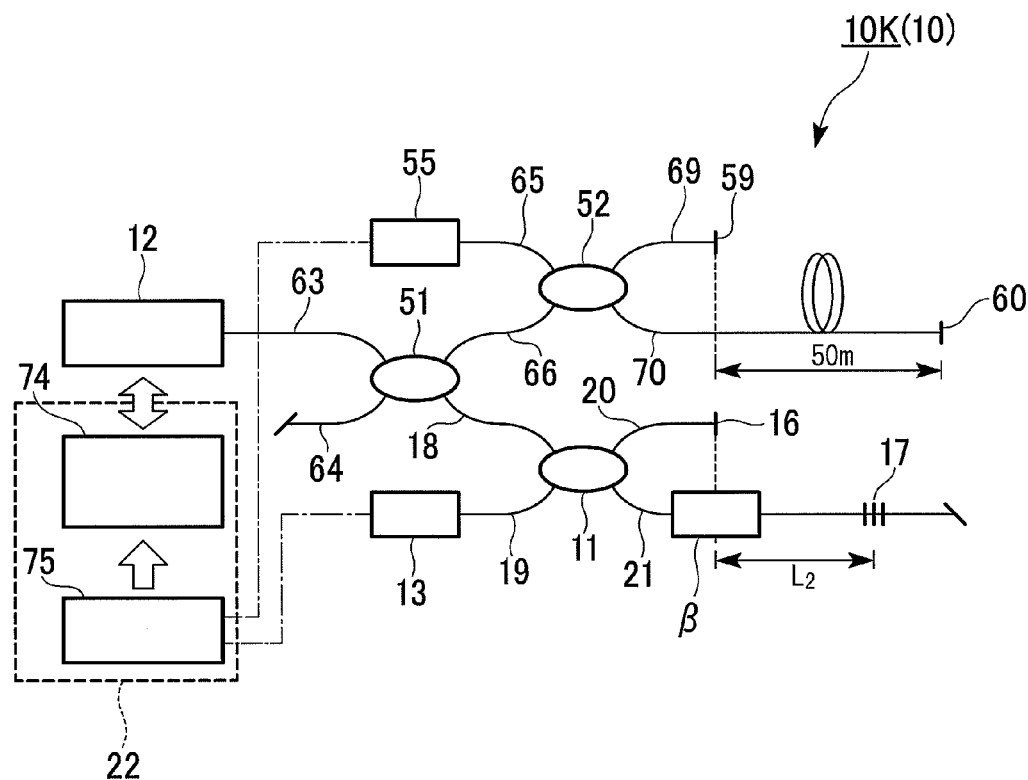
FIG. 25 is a schematic configuration view showing the physical quantity measuring apparatus utilizing optical frequency domain reflectometry of Example 7 of the present invention.

Besides providing the incidence part β that inputs the measuring light to either polarization axis among the two orthogonal polarization axes in the third polarization maintaining fiber instead of the incidence part α, a physical quantity measuring apparatus utilizing OFDR was manufactured similarly to the Example 1, and this is used as Example 7. FIG. 25 is a schematic configuration view that shows the physical quantity measuring apparatus utilizing OFDR 10K of Example 7. As this incidence part β, a λ/2 plate is used.

The state of the sensor 17 was measured using the physical quantity measuring apparatus utilizing OFDR 10K of the present example. The result is shown in FIGS. 26 and 27.

Figure 26:
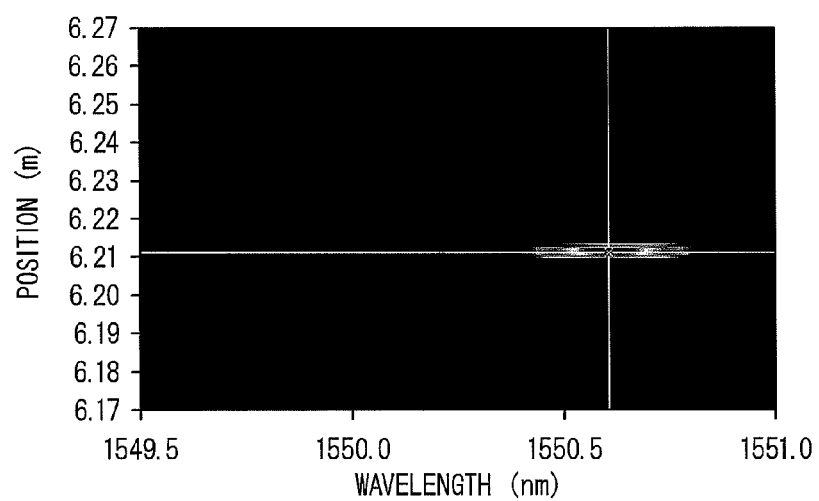
FIG. 26 is a spectrogram showing the measurement result of the state of the sensor using the same Example 7.
Figure 27:
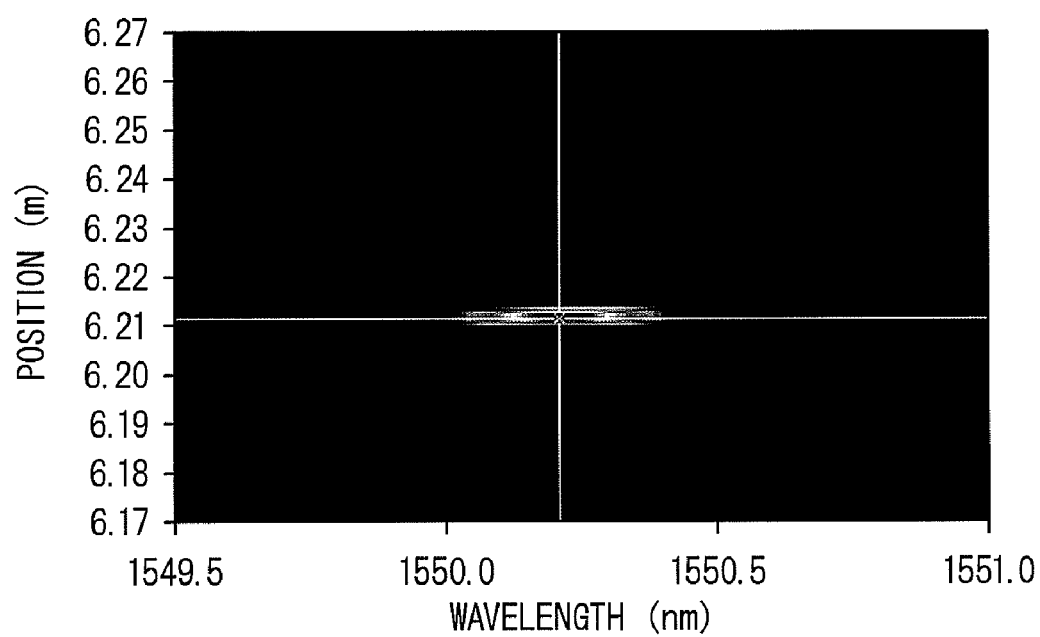
FIG. 27 is a spectrogram showing the measurement result of the state of the sensor using the same Example 7.

FIG. 26 is a spectrogram that shows the result of analyzing the optical interference signal $D_5$ that is inputted to the photodiode 13 in the slow axis measurement mode. FIG. 27 is a spectrogram that shows the result of analyzing the optical interference signal $D_6$ that is inputted to the photodiode 14 in the fast axis measurement mode.

In the spectrogram shown in FIG. 26, the Bragg reflected light of 1550.6 nm is from the slow axis of the sensor 17. In the spectrogram shown in FIG. 27, the Bragg reflected light of 1550.2 nm is from the fast axis of the sensor 17. The positions of these two Bragg reflected lights are both approximately 6.212 m.

In this Example 7, the first measurement is performed by the slow axis measurement mode, and the second measurement is performed by the fast axis measurement mode. That is, two different signals are obtained in the two measurements, and these signals are individually analyzed.

In this Example 7, since Bragg reflected lights from the two orthogonal polarization axes of the sensor 17 are obtained, it was confirmed that it is theoretically possible to measure temperature and strain. Thereby, in the case of performing strain measurement using the physical quantity measuring apparatus utilizing OFDR 10K of the present example, a temperature compensation sensor is not required. Also, since only an optical interference signal from the Bragg reflected light in one of the two orthogonal polarization axes of the sensor 17 is obtained in one measurement, it is possible to individually identify and measure the change amounts of the Bragg reflected light from the two orthogonal polarization axes in the sensor 17. Thereby, it is possible to improve the measuring accuracy of the temperature and strain in the sensor 17. Moreover, since $L_2$ is obtained by substituting the known $n_{slow}$ and $n_{fast}$ in the two optical wavelengths $n_{slow}L_2$ and $n_{fast}L_2$ obtained by the respective measurements, it is possible to accurately measure the fiber length $L_2$ of the sensor 17.

As described above, it is possible to obtain similar working effects in Example 2 and Example 7.

This is also clear from what the aforementioned Equation (4) which shows the optical interference signal $D_2$ obtained by the photodiode 13 and the aforementioned Equation (5) which shows the optical interference signal $D_3$ obtained by the photodiode 14 being expressed by the same equations in the Example 2; and what the aforementioned Equation (8) which shows the optical interference signal $D_5$ obtained by the photodiode 13 in the slow axis measurement mode and the aforementioned Equation (9) which shows the optical interference signal $D_6$ obtained by the photodiode 14 in the fast axis measurement mode being expressed by the same equations in the Example 7.

Also, with regard to Example 2 and Example 7, the Example 2 has the advantage that can provide a physical quantity measuring apparatus utilizing OFDR which can measuring the temperature and strain of the sensor 17 in a short time, by parallelly processing the optical interference signals obtained from the two photodiodes (photodiodes 13 and 14).

On the other hand, the Example 7 has the advantage that can provide a physical quantity measuring apparatus utilizing OFDR with a lower cost, since there is no need to use a polarization beam splitter.

Examples 1 to 7 illustrate the physical quantity measuring apparatus utilizing OFDR that arrange one FBG sensor in one PM fiber, but the physical quantity measuring apparatus utilizing OFDR of the present invention is not limited thereto. In the physical quantity measuring apparatus utilizing OFDR of the present invention, a plurality of FBG sensors can be provided in one PM fiber.

INDUSTRIAL APPLICABILITY

According to the physical quantity measuring apparatus utilizing OFDR of the present invention, it is possible to provide a physical quantity measuring apparatus utilizing OFDR in which measurement of temperature and strain is particularly possible and is capable of measuring temperature and strain with a high spatial resolution.

The invention claimed is:

1. A physical quantity measuring apparatus utilizing optical frequency domain reflectometry, comprising:
a tunable laser that emits measuring light;
a first polarization maintaining fiber with one end thereof connected with the tunable laser;
a polarization maintaining coupler connected with another end of the first polarization maintaining fiber;
a second polarization maintaining fiber with one end thereof connected with the polarization maintaining coupler, and another end thereof being a referential reflecting end;
a third polarization maintaining fiber with one end thereof connected with the polarization maintaining coupler;
a sensor consists of a fiber Bragg grating formed at a core of the third polarization maintaining fiber;
a fourth polarization maintaining fiber with one end thereof connected with the polarization maintaining coupler;
a photodiode connected with the polarization maintaining coupler via the fourth polarization maintaining fiber, and detects Bragg reflected light from the sensor and reference light from the referential reflecting end;
a controller that detects modulation of an interference intensity between the Bragg reflected light and the reference light, based on an intensity change of multiplexed light of the Bragg reflected light and the reference light detected by the photodiode; and
an incidence part α that inputs the measuring light to both two orthogonal polarization axes of the second polarization maintaining fiber and two orthogonal polarization axes of the third polarization maintaining fiber,
wherein the incidence part α being provided on the first polarization maintaining fiber, or on both the second polarization maintaining fiber and the third polarization maintaining fiber.

2. The physical quantity measuring apparatus utilizing optical frequency domain reflectometry according to claim 1, wherein:
the incidence part α is a 45-degree polarization axis offset angle fusion splice part on the first polarization maintaining fiber, while the incidence part α is provided on the first polarization maintaining fiber; and
the incidence part α is a 45-degree polarization axis offset angle fusion splice part on each the second polarization maintaining fiber and the third polarization maintaining fiber, while the incidence part α is provided on both the second polarization maintaining fiber and the third polarization maintaining fiber.

3. The physical quantity measuring apparatus utilizing optical frequency domain reflectometry according to claim 1, wherein a polarization beam splitter that splits the Bragg reflected light from the sensor being provided in the fourth polarization maintaining fiber.

4. The physical quantity measuring apparatus utilizing optical frequency domain reflectometry according to claim 2, wherein a polarization beam splitter that splits the Bragg reflected light from the sensor being provided in the fourth polarization maintaining fiber.

5. The physical quantity measuring apparatus utilizing optical frequency domain reflectometry according to claim 1, wherein an extension fiber that makes an optical path-length difference of the Bragg reflected light from the two orthogonal polarization axes in the sensor longer than an optical path-length corresponding to a length of the sensor being provided between the sensor and the polarization maintaining coupler in the third polarization maintaining fiber.

6. The physical quantity measuring apparatus utilizing optical frequency domain reflectometry according to claim 2, wherein an extension fiber that makes an optical path-length difference of the Bragg reflected light from the two orthogonal polarization axes in the sensor longer than an optical path-length corresponding to a length of the sensor being provided between the sensor and the polarization maintaining coupler in the third polarization maintaining fiber.

7. The physical quantity measuring apparatus utilizing optical frequency domain reflectometry according to claims 3, wherein an extension fiber that makes an optical path-length difference of the Bragg reflected light from the two orthogonal polarization axes in the sensor longer than an optical path-length corresponding to a length of the sensor being provided between the sensor and the polarization maintaining coupler in the third polarization maintaining fiber.

8. The physical quantity measuring apparatus utilizing optical frequency domain reflectometry according to claim 4, wherein an extension fiber that makes an optical path-length difference of the Bragg reflected light from the two orthogonal polarization axes in the sensor longer than an optical path-length corresponding to a length of the sensor being provided between the sensor and the polarization maintaining coupler in the third polarization maintaining fiber.

9. The physical quantity measuring apparatus utilizing optical frequency domain reflectometry according to claim 5, wherein, while a length of the extension fiber being L, a difference of an effective refractive indices of the two orthogonal polarization axes being $(n_{slow}-n_{fast})$, and the length of the sensor being l, the length L satisfying following Equation (1)

$$L_1 > \frac{n_{slow} l}{n_{slow} - n_{fast}}. \tag{1}$$

10. A physical quantity measuring apparatus utilizing optical frequency domain reflectometry, comprising:
a tunable laser that emits measuring light;
a first polarization maintaining fiber with one end thereof connected with the tunable laser;
a polarization maintaining coupler connected with another end of the first polarization maintaining fiber;
a second polarization maintaining fiber with one end thereof connected with the polarization maintaining coupler, and another end thereof being a referential reflecting end;
a third polarization maintaining fiber with one end thereof connected with the polarization maintaining coupler;
a sensor consists of a fiber Bragg grating formed at a core of the third polarization maintaining fiber;

a fourth polarization maintaining fiber with one end thereof connected with the polarization maintaining coupler;

a photodiode connected with the polarization maintaining coupler via the fourth polarization maintaining fiber, and detects Bragg reflected light from the sensor and reference light from the referential reflecting end;

a controller that detects modulation of an interference intensity between the Bragg reflected light and the reference light, based on an intensity change of multiplexed light of the Bragg reflected light and the reference light detected by the photodiode; and an incidence part β that inputs measuring light to either polarization axis among two orthogonal polarization axes in the third polarization maintaining fiber, wherein the incidence part β being provided on the third polarization maintaining fiber.

11. The physical quantity measuring apparatus utilizing optical frequency domain reflectometry according to claim 1, wherein, among the first polarization maintaining fiber to the fourth polarization maintaining fiber, a difference of an effective refractive indices of the two orthogonal polarization axes in at least the third polarization maintaining fiber being $4.4 \times 10^{-4}$ or more.

12. A method for temperature and strain measurement using a physical quantity measuring apparatus utilizing optical frequency domain reflectometry according to claim 1, comprising:

measuring a wavelength of a Bragg reflected light from two orthogonal polarization axes at one or a plurality of sensors;

calculating an amount of change in the wavelength of the Bragg reflected light at the sensor caused by temperature and strain, based on the measured wavelength of the Bragg reflected light; and calculating the temperature and strain at a location where the sensor is provided, based on the calculated amount of change.

13. A method for temperature and strain measurement using a physical quantity measuring apparatus utilizing optical frequency domain reflectometry according to claim 3, comprising:

performing a short-time Fourier transform analysis for identifying a position of the sensor on each interference signal of two orthogonal polarization axes detected by the controller; and obtaining the position of the sensor in each polarization axis, by substituting each effective refractive index of the polarization axis in each optical path-length of Bragg reflected light from the two orthogonal polarization axes in the sensor.

14. A method for temperature and strain measurement using a physical quantity measuring apparatus utilizing optical frequency domain reflectometry according to claim 5, comprising:

performing a short-time Fourier transform analysis for identifying a position of the sensor on a summation of interference signals from two orthogonal polarization axes detected by the controller; and obtaining a distance to the sensor from a reference position in each polarization axis, by substituting one arbitrary effective refractive index in each optical path-length of Bragg reflected light from the two orthogonal polarization axes in the sensor.

15. The method for temperature and strain measurement according to claim 12, further comprises calculating temperature distribution and strain distribution along a long direction of a location where the sensor is provided on a third polarization maintaining fiber.

16. The method for temperature and strain measurement according to claim 13, further comprises calculating temperature distribution and strain distribution along a long direction of a location where the sensor is provided on a third polarization maintaining fiber.

17. The method for temperature and strain measurement according to claim 14, further comprises calculating temperature distribution and strain distribution along a long direction of a location where the sensor is provided on a third polarization maintaining fiber.

18. A method for temperature and strain measurement using a physical quantity measuring apparatus utilizing optical frequency domain reflectometry according to claim 10, comprising:

measuring a wavelength of a Bragg reflected light from two orthogonal polarization axes at one or a plurality of sensors;

calculating an amount of change in the wavelength of the Bragg reflected light at the sensor caused by temperature and strain, based on the measured wavelength of the Bragg reflected light; and calculating the temperature and strain at a location where the sensor is provided, based on the calculated amount of change.

19. A method for temperature and strain measurement using a physical quantity measuring apparatus utilizing optical frequency domain reflectometry according to claim 10, comprising:

performing a short-time Fourier transform analysis for identifying a position of the sensor on each interference signal of two orthogonal polarization axes detected by the controller; and obtaining the position of the sensor in each polarization axis, by substituting each effective refractive index of the polarization axis in each optical path-length of Bragg reflected light from the two orthogonal polarization axes in the sensor.

* * * * *